United States Patent [19]

Ballegeer et al.

[11] Patent Number: 4,495,573
[45] Date of Patent: Jan. 22, 1985

[54] METHOD AND DEVICE FOR TRANSMISSION OF DIGITAL DATA

[75] Inventors: Jean C. Ballegeer; Duyet H. Nguyen, both of Paris, France

[73] Assignee: Thomson-CSF, Paris, France

[21] Appl. No.: 363,389

[22] Filed: Mar. 29, 1982

[30] Foreign Application Priority Data

Apr. 8, 1981 [FR] France ................ 81 07037

[51] Int. Cl.³ .............................................. G06F 9/06
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,713,109 | 1/1973 | Hornung | 364/200 |
| 3,810,103 | 5/1974 | Ricci | 364/900 |
| 4,000,485 | 12/1976 | Barlow et al. | 364/200 |
| 4,149,239 | 4/1979 | Jenkins et al. | 364/200 |
| 4,174,536 | 11/1979 | Misunas et al. | 364/200 |
| 4,245,306 | 1/1981 | Basemer et al. | 364/200 |

FOREIGN PATENT DOCUMENTS 1595449 12/1977 United Kingdom .

OTHER PUBLICATIONS de la Logique Cablee Aux Microprocesseurs–Bernard et al., (pp. 136-138).
Integrated Circuits Catalog from Texas Instruments (pp. 168-170).

Primary Examiner—Harvey E. Springborn
Attorney, Agent, or Firm—Cushman, Darby & Cushman

[57] ABSTRACT

In a system comprising data-processing units, some of which are masters and others of which are slaves, all the units are connected to a common bus via interface circuits. Only the master units are capable of acquiring instantaneous control of the bus by means of a resource allocation device. By utilizing a set of three basic control signals carried by the bus, three distinct addressing modes can be established: master-to-master, master-to-slave, general master-broadcasting to all units in accordance with a number of chronologies and transmission modes. In an alternative embodiment, substitutions of addresses can be performed directly on the bus.

20 Claims, 19 Drawing Figures

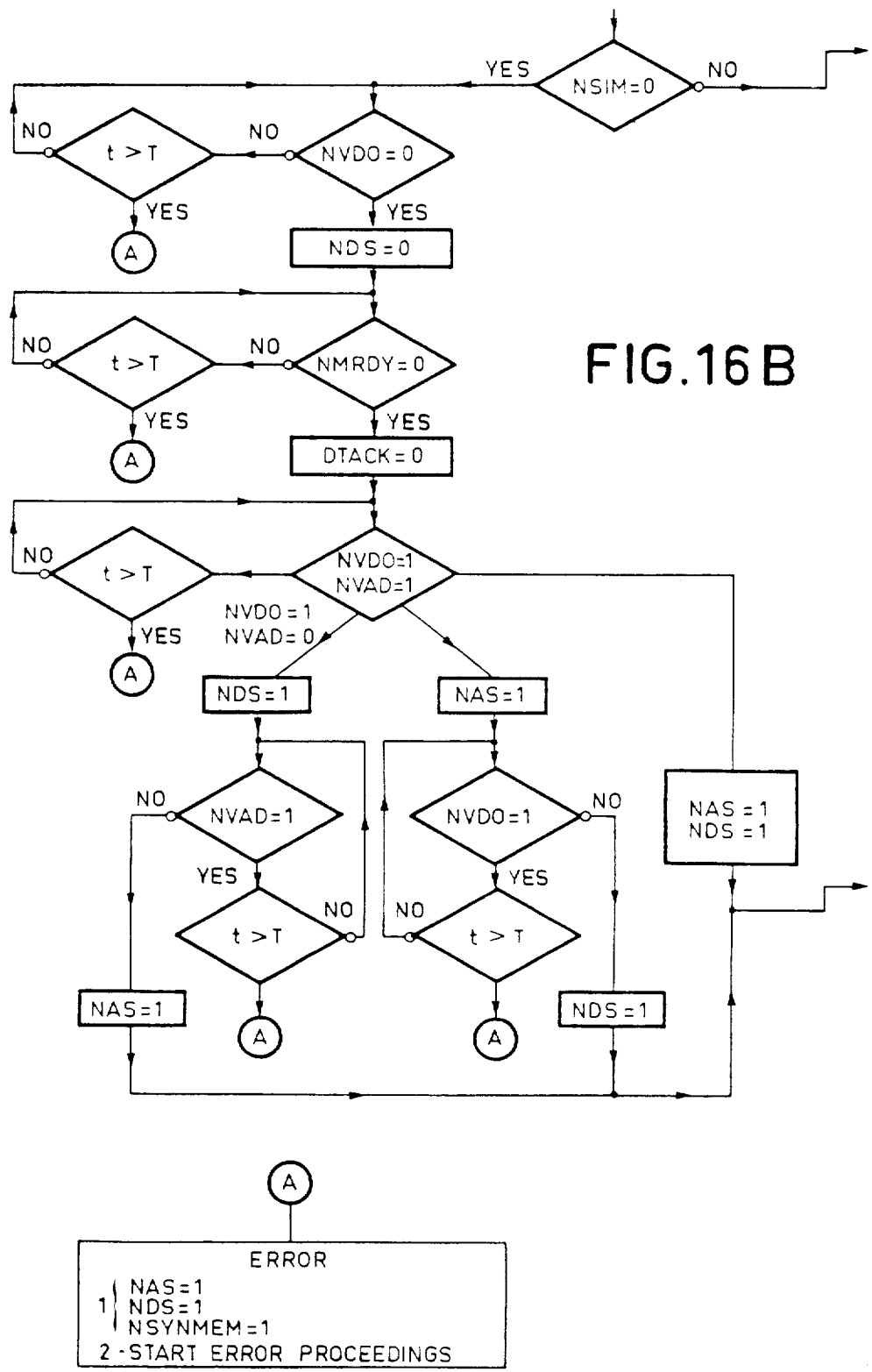

METHOD AND DEVICE FOR TRANSMISSION OF DIGITAL DATA

This invention relates to a method and to a device for transmission of data in digital form for a system comprising off-line data-processing units which are capable of transmitting and/or receiving data.

The term "data-processing unit" as used in the context of the invention should be taken in its broadest sense. Such units may be processors or peripheral units such as mass-memory units, printers, card readers, magnetic tape units, magnetic drums, and so on. Transmission of data from one unit to one or a number of other units takes place by means of a common set of electric conductors to which all the processing units are connected and which is usually known as a bus. The invention permits a dialog between processors or between one processor and one or a number of peripherals or else between peripherals associated with the processors.

In the description which follows, all the data-processing units which are capable of transmitting and/or receiving digital data will be designated simply as "units".

The invention (including both apparatus and method) must satisfy a number of different criteria at the same time. For example, it must permit parallel operation of special-purpose units or must accommodate units of different technology and/or of different families between them, especially units having work cycles which are different from each other. Another important condition to be satisfied is the harmonious adaptation of each unit to the overall workload of the system while also taking special local conditions into account. It must also permit a change in configuration of the system such as extensibility without entailing any need for appreciable transformations.

Finally, it is also very important to ensure maximum reliability of the system. Faulty operation of one of the units must not influence the operation of the other units and, in particular, must not prevent access to a common resource when these units are in competition with the faulty unit. In more general terms, the operation of the system must be reliable and all hang-ups must be prevented.

Many problems relating to interactions between the various units arise in all these systems. In particular, when two or more units are in competition in order to obtain access to one and the same resource, this type of conflict must be resolved in an optimum manner. Within the specific framework of the invention, this resource is the common bus.

In a large number of applications, it is therefore found necessary to utilize a flexible and efficient method of resource allocation and this constitutes a first requirement to be satisfied. Many methods of resource allocation are already known. In the majority of instances, these methods incorporate procedures involving assignment of a priority level to units in competition.

The first known methods permitted an allocation of resources as a function of priorities distributed according to a fixed hierarchic pattern or else according to a cyclic time distribution under the control of some centralized controller.

In the field of data-processing systems comprising means for establishing connections between bus-type units, more flexible methods of resource allocation than those mentioned in the foregoing have been proposed. These methods lay down procedures either for dynamic assignment of priority or else involve the so-called "handshake" procedures for exchanging a sequence of messages of the "enable and/or accept request" type. Methods of this type are described in U.S. Pat. Nos. 3,810,103, RE 29,246 and in United Kingdom Pat. GB-A No. 1,595,449. Although introducing a higher degree of decentralization in bus-allocation decision-making, it still remains necessary in these methods to make use of a centralized unit for ensuring good execution of procedures, whether this unit consists of one of the processors connected to the bus or of a special-purpose unit known under different denominations such as a "bus monitor" or a "bus arbiter".

In order to satisfy the aforementioned requirement more completely and to circumvent the disadvantages of the prior art, a fully decentralized method of resource allocation can accordingly be adopted.

In this decentralized method of allocation, each data-processing unit of a system is associated with a standard resource allocation interface circuit and these interface circuits are coupled to each other by means of a bus which transmits a first binary signal indicating that at least one unit requests access to a resource, a second binary signal indicating that no unit is utilizing said resource and a third binary signal of predetermined duration which permits initiation of competition between requesting units and allocation of the resource to a winning unit, a first binary word being intended to indicate the highest priority level and a second binary word being intended to indicate the number of the winning unit.

A further noteworthy advantage is that this method makes it possible to minimize time losses at the moment of initial assignment of a resource or of a change of assignment of said resource.

This method of allocation of a resource will hereinafter be recalled in greater detail since it applies in a particularly advantageous manner to systems which embody the teachings of the present invention.

The invention is more specifically concerned with an apparatus and method for the management of exchanges of digital data between the units after assignment of the bus allocation to one of the units.

It is in fact necessary for this specific task to adopt methods which are also flexible and highly efficient in order to avoid any adverse effect on the enhanced flexibility and efficiency achieved as a result of application of the aforementioned method of allocation.

This constitutes a second requirement which the present invention is precisely intended to fulfil.

Within the scope of the invention, the units constituting the system can be of two main types, namely "master" units and "slave" units. The "master" units can be either processors or peripheral units and it should be understood that instantaneous control of the common connecting bus can be assigned successively to units by the aforementioned method of resource allocation in accordance with fully decentralized procedures, the initiative of request for bus control having been taken by at least that unit to which control may have been assigned by other units of the "master" type which were in competition with the winning unit. The "slave" units do not have the possibility of acquiring control of the bus.

The method according to the invention permits transfers in three different modes of addressing by utilization of service signals:

transfer from master to slave;

transfer from master to master;

transfer from master to other units in general broadcast.

The method further comprises an address substitution arrangement which permits direct processing on the bus of a device for receiving a virtual address from a master unit and providing in response thereto a corresponding real address of another unit.

The invention accordingly relates to an arrangement for the transmission of digital data between units of a data-processing system via a data-transmission channel of the multiple-conductor bus type to which all the units of the system are connected through interface circuits. The system comprises master-type units which are capable of requesting and acquiring instantaneous control of the transmission channel in order to address at least one other unit of the system and to initiate exchanges of data in the channel, and slave-type units which can be addressed by one master-type unit. The data-transmission system further comprises a device for allocating the instantaneous control of said channel to one of the master-type units requesting instantaneous control of the channel. The method is distinguished by the fact that transmission of data over the channel is selectively performed in one out of three differentiated addressing mode, each addressing mode being exclusive with respect to the other two modes and being initiated by transmission of at least one particular control signal of binary type over the transmission channel through the interface circuits associated with the master-type unit which has acquired instantaneous control of the transmission channel, the control signal being capable of assuming first and second logic (binary) states and being selected from among the three following signals:

- a first control signal caused by setting into a first logic state to initiate a point-to-point data transfer between the master-type unit which has acquired instantaneous control of the transmission channel and a slave-type unit addressed by said master-type unit;
- a second control signal caused by setting into the first logic state to initiate a point-to-point data transfer between the master-type unit which has acquired instantaneous control of the transmission channel and a second master-type unit addressed by the first master-type unit;
- and a third control signal caused by setting into the second logic state conjointly with setting of the first logic state or of the second control signal into the same logic state to initiate a data transfer in general broadcast between the master-type unit which has acquired instantaneous control of the transmission channel and at least all the other master-type units of said system, all of the units being addressed simultaneously.

The invention further relates to a device for carrying out the method outlined in the foregoing.

These and other features of the invention will be more apparent to those versed in the art upon consideration of the following description and accompanying drawings, wherein.

Figure 16:
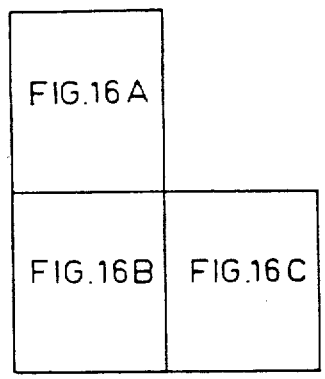
Figure 16A:
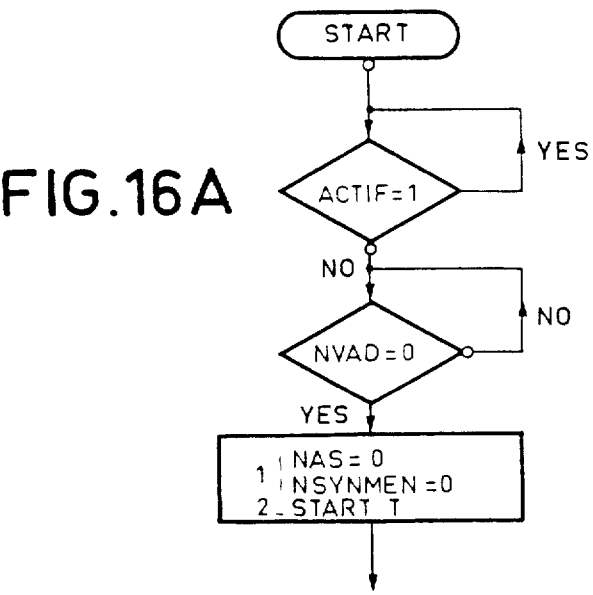
Figure 16C:
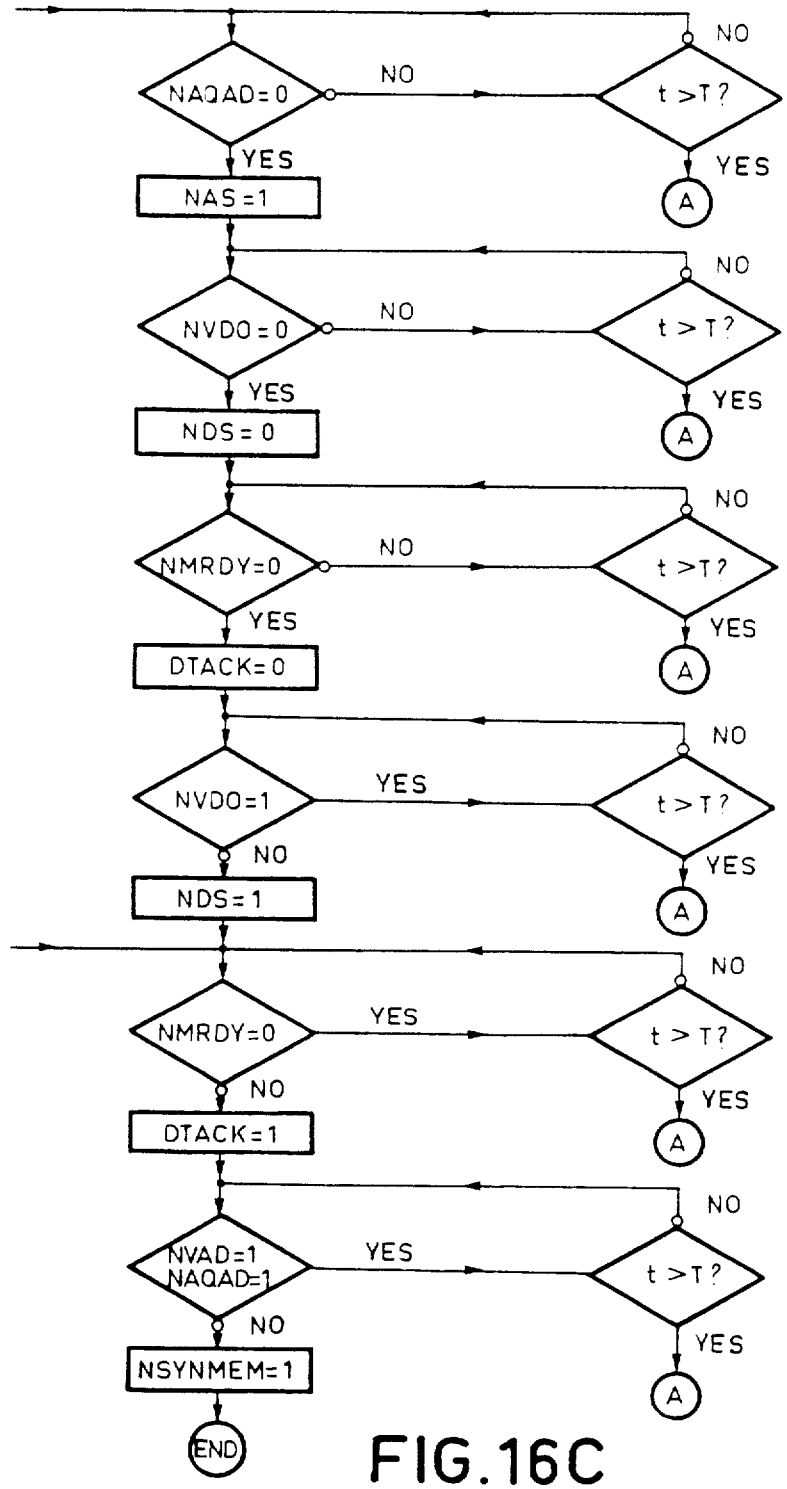

FIG. 16 explains how FIGS. 16A to 16C relate to one another;

FIGS. 16A to 16C constitute a flow chart in which the different operating modes of the device according to the invention are summarized.

Figure 1:
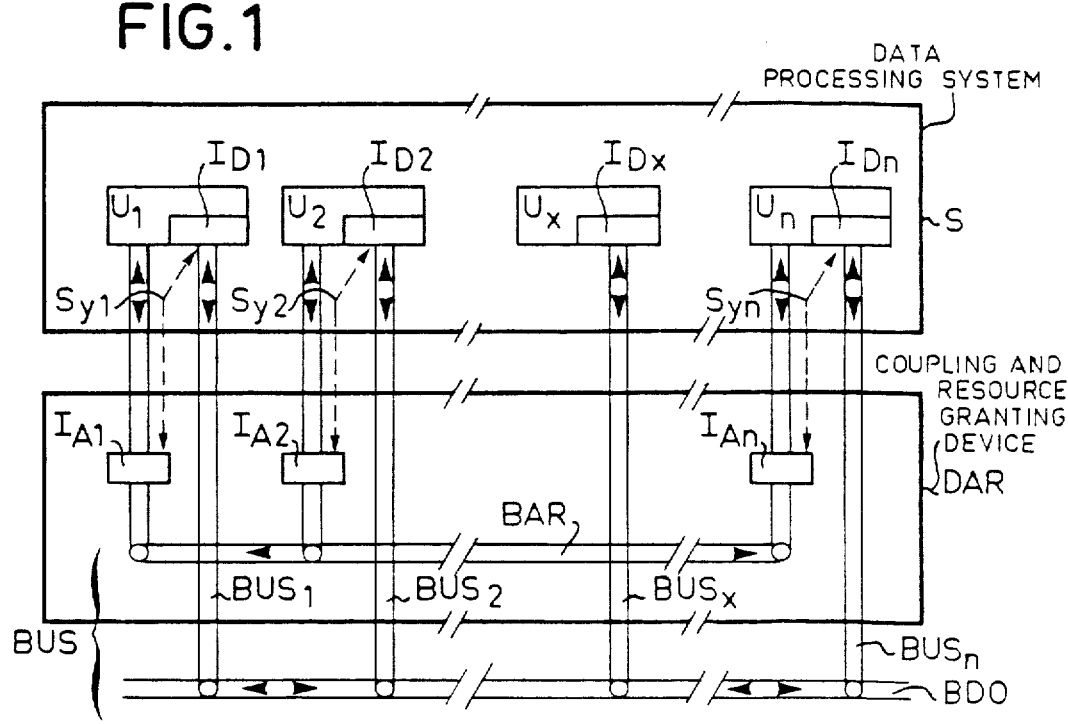
FIG. 1 is a schematic diagram showing the architecture of a data-processing system incorporating the present invention.

FIG. 1 shows diagrammatically the architecture of a data-processing system S to which the invention is applicable. The system comprises a plurality of offline data-processing units $U_1$ to $U_n$. These units can be of various types including, for example processors and peripheral units. As recalled in the foregoing, each of units U fall into one of two classes: "master" units $U_1$, $U_2$, $U_n$ and "slave" units, only one of which is shown in FIG. 1, namely the unit $U_x$.

All of these units are connected to a bus-type data-exchange channel "BUS". This channel constitutes the resource to be allocated for which the units U are in competition.

In addition to the resource allocation device "DAR" which has already been mentioned and comprises its own bus "BAR", the system S comprises a connecting channel "BDO" for the exchange of data, this exchange being of the bidirectional type. In accordance with customary practice and as illustrated in greater detail in FIG. 2, said channel can comprise a bus which carries address words "ADR" such as words consisting of thirty-two bits, for example, a bus for carrying data words "DON" such as, for example, words which also consist of thirty-two bits and can be divided into octets, and a bus for carrying service signals "SPE". The last-mentioned signals usually include signals for producing reliable exchanges such as clock signals, synchronization signals, and so on. Said bus can also comprise ground connections and connections for carrying the necessary voltages for operation of the different units connected thereto, depending on the nature of the technologies employed.

Finally, the device comprises a fourth bus "CNT" which carries signals for control and management of transfers according to one of the most important aspects of the invention.

The units $U_1$ to $U_n$ can communicate with the channel "BDO" by means of specific buses designated as "$BUS_1$" to "$BUS_n$" via interface circuits $I_{D1}$ to $I_{Dn}$. The design function of these circuits is to carry out all the necessary matching operations for connecting a particular unit $U_i$ to the channel "BDO", such matching operations being of either a technological or logical character as is already known.

Although it does not come within the scope of the present invention, the aforementioned resource allocation procedure must be precisely recalled in order to gain a clear understanding of the invention. The case under consideration is more specifically concerned with the method of allocation of the bus "BDO" to a master-type unit which requests said allocation.

To this end, the system S comprises a resource allocation device "DAR" provided with a specific bus "BAR" to which all the master-type units are connected.

In order to resolve access conflicts, the resource allocation device "DAR" comprises interface circuits $I_{A1}$ to $I_{An}$ and a multiple-connection channel "BAR" of the bus type for coupling between the interface circuits. This bus is described in greater detail with reference to FIG. 3. The master-type units $U_1$ to $U_n$ of the system S are coupled through a specific bus $B_{A1}$ to $B_{An}$ in each case to an interface circuit $I_{A1}$ to $I_{An}$ which is associated therewith and which will hereinafter be designated more briefly as an "interface".

In accordance with an important feature, all the interface circuits $I_{A1}$ to $I_{An}$ are identical or in other words standardized and the method of resource allocation permits complete decentralization of the allocation decisions.

With this objective, recourse is had to a set of three basic signals:

a signal indicating that there is at least one unit requesting the use of the common resource (bus "BDO"). This signal will be designated hereinafter as "NDEMAN";

a signal designated as "PERSO" indicating that said resource is no longer under the control of any unit;

and a signal designated as "NCOUR" of predetermined duration which initiates the procedure involved in assignment of the resource to one of the units, namely the so-called winning unit, and which freezes all the other requests during the predetermined time interval.

Preferably, these signals are of the binary type and are therefore capable of assuming an any moment in time one of two logical states "0" or "1".

Furthermore, a number or address and a priority level is assigned to each unit. This assignment may be carried out by any procedure of the prior art but is preferably dynamic.

The procedure involving acquisition of control of a resource is broken-down into two sub-procedures:

arbitration between a number of units which are candidates for said control;

transfer of said control from one unit to another after a period of activity of the unit which had obtained said control.

In a preferred alternative embodiment of the invention, assignment of priority levels takes place in accordance with a diagram comprising dynamic assignment of levels. This assignment can be performed by the use of data recorded in a memory and preferentially in a non-volatile memory of the PROM type (programmable read-only memory). The priority level will be calculated according to a preferred alternative embodiment by determining the difference between the numbers assigned to the unit which is in activity and to the unit which requests control of the resource to be allocated.

The bus "BDO" is assigned to a so-called winning unit on completion of a "race" between the competing units during which the winning unit will have indicated the highest degree of priority.

A race is started as soon as the following three conditions have all been met:

active "NDEMAN" (low level or logical 0) which indicates that at least one unit $U_i$ requests control of the bus "BDO";

active "PERSO" (high level) which indicates that there is no race in progress.

The index i is a whole number within the range of 1 to m where m represents the number of master-type units which can gain access to the bus "BDO".

Figure 8:
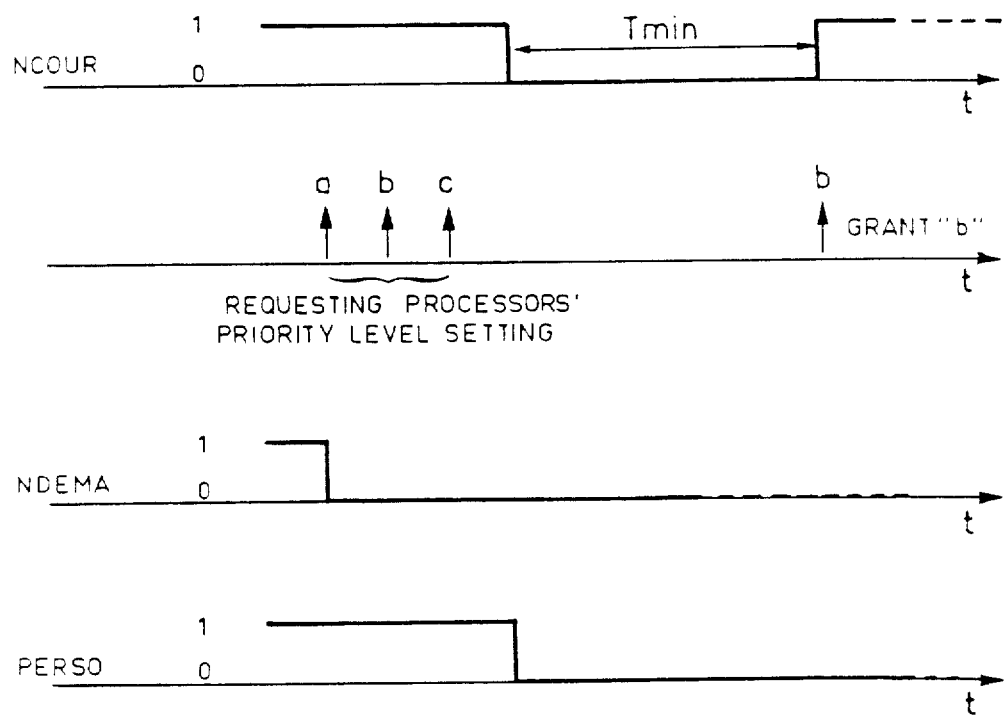
FIGS. 8 and 9 are diagrams illustrating the operation of the resource allocation device.

The diagram of FIG. 8 illustrates the case in which three data-processors a, b and c desire to acquire control of the bus "BDO".

The start of the race is given by the falling edge of the signal "NCOUR" as indicated in the first line of the diagram of FIG. 8 and is initiated simultaneously by the interfaces which have been the first to detect the starting conditions. In the case of each unit, a new priority has been calculated prior to the falling edge of the signal "NCOUR". This priority is indicated only by the units a, b, c which have placed a bus request. After the necessary period of propagation of the signals, the bus is assigned to the unit b which has shown the highest degree of priority. This also has the effect of returning the signal "PERSO" to the low level (logical 0) and also of preventing any further race.

Within the scope of the data-processing system of FIG. 1, each data-processing unit $U_n$ can have a basic work cycle which is specific to that unit. When the units are of different technologies and/or families, these cycle times are different from each other. Cycle times are defined by an internal clock or by clock signals derived from a centralized clock.

After a predetermined time interval $T_{min}$ determined by the slowest clock of the units which have started the race, the signal "NCOUR" is recorded and the winning unit b displays its number and indicates the beginning of utilization of the resource by said unit.

Figure 3:
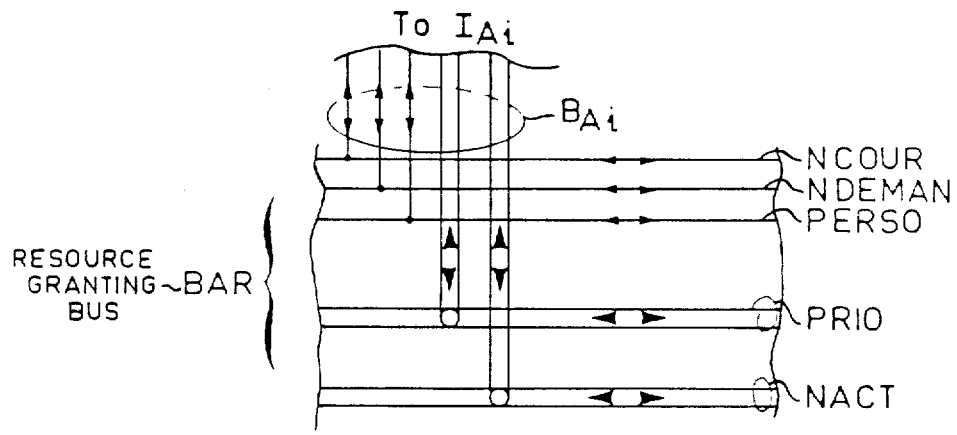
FIGS. 3 and 4 are schematic diagrams showing details of the resource allocation device which can be employed in the FIG. 1 system.

FIG. 3 shows in greater detail the bus "BAR" which provides a connection between the interface circuits $I_{A1}$ to $I_{An}$. This bus has three bidirectional connecting wires for transmitting the signals "NCOUR, NDEMA and PERSO". By convention, the letter "N" used as the first letter in the symbols designating the signals employed by the present invention means that these signals are active in the low or logical 0 state. Furthermore, these signals and their meanings are recalled in Table I which is given at the end of this description.

The bus "BAR" further comprises a channel "PRIO" having multiple bidirectional connections for transmitting a binary word which indicates the level of the highest degree of priority computed by the interfaces $I_{A1}$ to $I_{An}$. In one particular example of construction, the channel can comprise eight connecting leads each carrying one bit, the priority word being composed of an eight-bit byte or octet.

The bus "BAR" further comprises a channel "NACT" having multiple bidirectional connections consisting for example of four leads for transmitting a four-bit binary word representing the number of the winning processor (b in the example chosen) or more generally of the winning unit $U_i$.

In the foregoing description, consideration has been given to the principal embodiment of the method of resource allocation. This method can also be improved by means of two particular expedients which will now be recalled: advanced starting of the "race" or in other words essentially of the signal "NCOUR" and advanced activation of the "race".

So far as advanced starting of the race is concerned and in an initial state of the system in which the bus "BDO" is not active or in other words not allocated, the procedure involved in acquiring control of the bus and described in the foregoing does not make it possible to determine the precise instants of beginning and ending of a race. The maximum that each candidate unit can know is the moment at which it will itself initiate the race. Furthermore, as soon as a race has ended, immediate enabling of another unit then becomes possible. From that time onwards, an active unit which desires to leave the resource should permit a race by recording the signal "PERSO" only upon completion of its last cycle. However, if the active unit is both a candidate and a winner of the new race, it will thus have awaited one cycle to no useful purpose before re-acquiring the resource which it has left. Moreover, if the operation at the level of the resource is such that each unit is active during a constant and predetermined time interval, there is then a loss of time which is due to election of the next winner. Such periods of inactivity are unacceptable. It is a desirable objective to ensure that a race can be started in parallel with the last cycle of the active unit and that the race terminates at the same time as this cycle. To this end, the active unit alone starts the race in the event that it should detect the presence of a request for allocation of the bus "BDO" during its last cycle. It is only necessary for the active unit to test the connection which transmits the signal "NDEMA" without recording the signal "PERSO". If no request appears before the leading edge of its clock as defined on its cycle time, the active unit records the signal "PERSO" at the end of the cycle in order to leave the bus "BDO" and the normal case described earlier is repeated. The last active unit thus frees the bus "BDO" without having initiated a race but nevertheless leaves on the bus its active number which will continue to serve for computation of a fresh distribution of priorities for the next race.

In regard to the second measurement, advanced starting of "NCOUR" arises from the need to take into account and to satisfy as rapidly as possible a bus request or in other words in practice a race-starting request if this latter is presented sufficiently soon. In the same order of ideas, it is desirable to ensure that a winning unit can be validated as soon as possible. There is in fact a potential danger of loss of time caused by waiting for the end of the race in order to resynchronize the winner with its particular clock.

It is therefore sought whenever possible to validate the winning unit without awaiting the end of the race. If the last active unit again makes a request and is a winning unit, it can revert to the active mode as soon as it has completed its race. Since it is known that a winning unit can exit only one at a time, advanced starting does not interfere with good operation of the system.

If the winning unit is the sole requesting unit in the system S, it will require a time interval of only one clock cycle in order to re-acquire the resource after a period of inactivity.

Once the peripheral unit or the winning processor has been determined by the method of resource allocation which has just been described, the peripheral unit or the processor assumes control of the bus "BDO" and can make use of this bus for exchanging data with one or a number of other units, for example in accordance with a procedure of the following type: "addressing of a particular unit followed by the exchange proper" in accordance with the present invention and as described hereinafter.

In order to prevent monopolization of the data exchange channel by a particular unit, it is possible to allocate in a personalized manner a maximum period of time at the end of which the resource or (bus "BDO") has to be put back in competition and again assigned in accordance with the method of the invention. To this end, the clocks of each unit can be employed in association with a time base.

Figure 4:
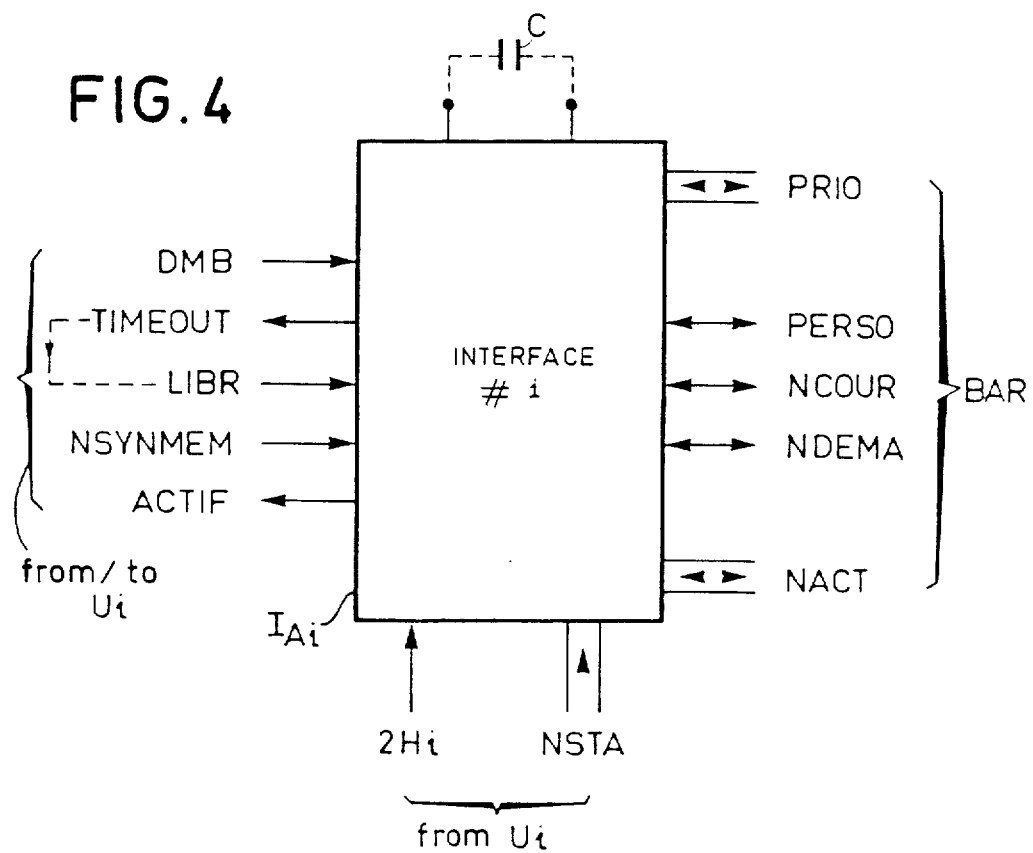

FIG. 4 is a schematic presentation of an interface circuit $I_{Ai}$. It is assumed in the first place that each unit $U_i$ is provided with a clock having a predetermined frequency and delivering clock signals $H_i$. These circuits are designed in the form of a module $I_{Ai}$ which is interconnected between the bus "BAR" and the associated unit $U_i$. The module receives clock signals "$2H_i$" having a frequency which is double that of the unit $U_i$, these clock signals being synchronized with each other. It is this clock which determines the minimum time-duration of the race initiated by the interface $I_{Ai}$. The clock period must be longer than or equal to a minimum time interval for ensuring good operation of the assembly but this time interval is dependent on the technology adopted.

Five signals are necessary in order to connect the interface to the associated unit.

The interface $I_{Ai}$ is warned that the unit $U_i$ has requested the data-exchange bus "BDO" by the signal "DMB".

Figure 9:
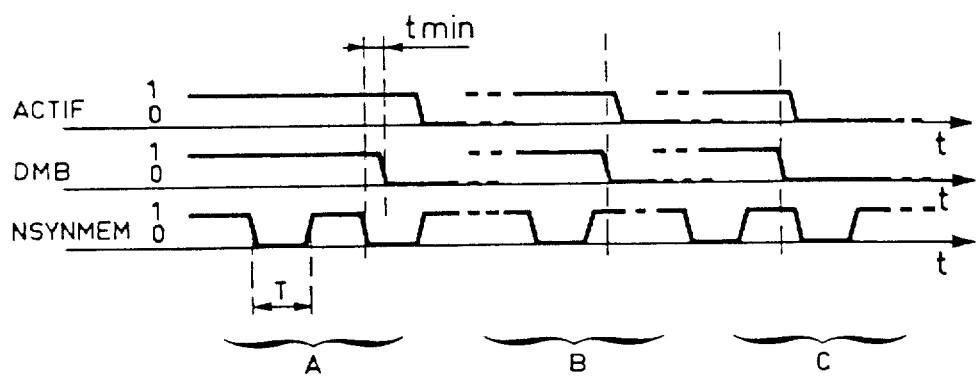

When the unit $U_i$ has been elected, the interface $I_{Ai}$ returns the signal "ACTIF" indicating that the bus "BDO" is available and that data transfers may begin. A signal "NSYNMEM" serves to synchronize the interface $I_{Ai}$ with the data exchange interface $I_{Di}$ which is also associated with the unit $U_i$. This interface is one of the essential elements of the invention and will be described in detail hereinafter. The signal aforesaid is one of the signals represented in FIG. 2 by the reference $S_{yi}$. The signal "NSYNMEM" represented in the last line of the diagram of FIG. 9 is active at the low or "0" logical level in accordance with the convention mentioned earlier and is a periodic signal having a time-duration T at the active level. This time-duration is equal to the time necessary for one data transfer on the bus "BDO". The signal interferes with the operation of the interface $I_{Ai}$ only at the instant of final transfer of data performed.

When the unit $U_i$ frees the bus "BDO", it has the possibility of indicating when the last transfer is to take place. To this end it is only necessary to ensure that the unit causes the signal "DMB" to fall again whilst the signal "NSYNMEM" is still active. This is shown in the portion A of the diagram of FIG. 9.

If the signal "DMB" falls again when "NSYMEM" is inactive, the interface $I_{Ai}$ considers that there will no longer be any transfers. This is shown in portion B of the diagram of FIG. 9.

This condition makes it possible to achieve an advanced race start as mentioned earlier. In order to improve the performances, it is preferable to utilize this function, in which case it is necessary to ensure that the signal "DMB" is correctly related to the signal "NSYNMEM".

In the general case, determination of the last transfer is under the responsibility of the unit $U_i$ which is in the active condition.

The portion C of the diagram of FIG. 9 represents the case in which faulty operation has appeared: the signal "ACTIF" has fallen prior to the last transfer to be performed.

A signal "TIMEOUT" regulates the maximum time interval associated with the unit $U_i$ for control of the bus "BDO". This time interval is determined by means of a capacitor C, for example, which is of predetermined value and produces action on a monostable device. Any other method can be employed such as a solely numerical method which makes use of binary counters having a modifiable capacity or associated with a logical system for selecting a particular state.

The signal "TIMEOUT" serves to distribute the accesses to the bus "BDO". Two fundamental modes of utilization can be defined:

the time interval defined by the signal "TIMEOUT" has a low value of the order of a few microseconds, for example. This time interval makes it possible for the unit $U_i$ to carry out one to two data transfers over the channel "BUS" during one activation of said unit and to release the channel "BUS" as soon as another requesting unit appears. In this case, each unit $U_1$ gains access to the channel "BUS" at frequent intervals but for short periods of time;

the time interval defined by the signal "TIMEOUT" is established so as to be of the same order of magnitude as the mean time-duration of the accesses to the channel "BUS" by the unit $U_i$. In this case, an activity is performed in sequence in the channel "BUS" by the unit $U_i$. Dead times are also utilized.

In response to the signal "TIMEOUT", the unit returns a signal "LIBR" for releasing the interface.

Finally, the interface receives on channel "NSTA" a binary word representing the number assigned to the unit $U_i$.

The procedure involved in allocation of the bus "BDO" may be summarized as follows:

A race is started each time one or a number of units ($U_1$ to $U_n$) desire to gain access to the channel "BUS" and to obtain control of said channel. The race makes it possible to "freeze" the requests for electing the highest-priority requesting unit.

A race is started in the following cases:

no master-type unit occupies the bus "BDO". Each unit initiates its own race.

a master-type unit $U_i$ is active on the bus "BDO" and has control of this latter. The unit initiates a race during its last transfer (signal "NSYNMEM").

the active master-type unit $U_i$ has reached the end of the time allowed ("TIMEOUT").

a race is initiated if the master-type unit which has gained control of the bus "BDO" withdraws its request (in exactly the same manner as in the previous case) or if its interface receives the release order ("LIBR"). In this case, the unit $U_i$ takes part in the new race if it has not withdrawn its request.

The signals "LIBR" and "DMB" are produced by the master-type unit $U_i$ which is associated with a given interface $I_{Ai}$.

Synchronization of the race takes place as follows:

When no master-type unit has gained control of the channel "BUS" (signal "PERSO" in the high state), the race is synchronized with the clock signals "$2H_i$" of the unit and has a time-duration equivalent to a clock period ("$2H_i$").

In the other case, one master-type unit is active: the race begins on the first wavefront of the clock signal "$2H_i$" after a fall of the signal "DMB". The race ends at the end of the last transfer if a clock period has already elapsed. The minimum duration of a race is therefore equal to one clock period.

Figure 10:
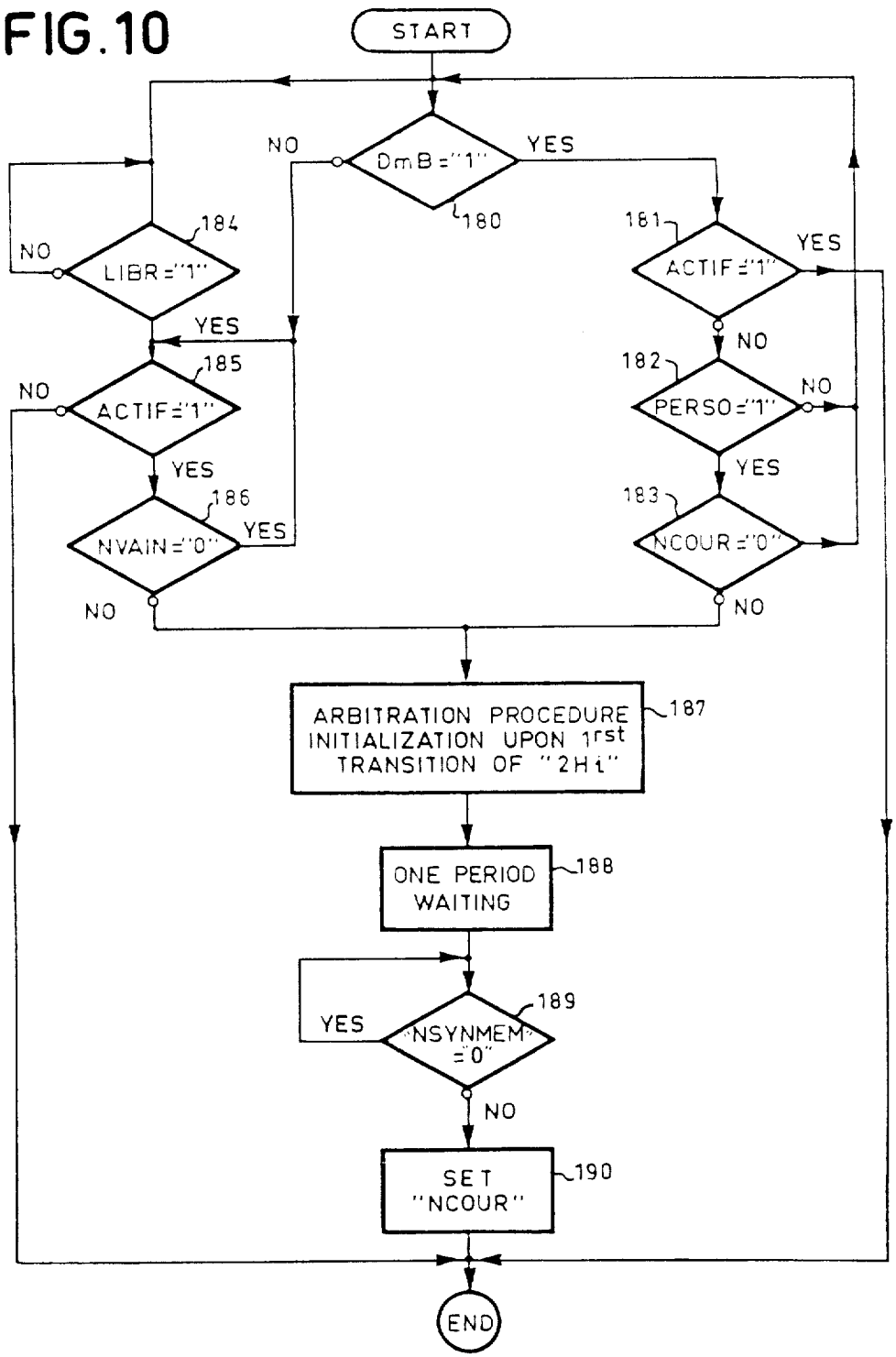
FIG. 10 is a flow diagram in which the different steps of the resource allocation are summarized.

The start of a race (fall of the signal "NCOUR") follows a well-determined sequence which is illustrated in the diagram of FIG. 10.

When a request for control of the bus "BDO" appears (at 180: signal "DMB"=1) and when the unit is not active (at 181: signal "ACTIF"=0), the conditions of initiation of a race (at 187) are as follows: no unit has control of the bus "BDO" (at 182: signal "PERSO"=1) and no other race is started (at 183: signal "NCOUR"=0). In this case, after a period of clock signals "$2H_i$" (at 188), the signal "NCOUR" is restored to the high state in order to ensure election of the winning unit. In this case, the signal "NSYNMEM" is in the high (inactive) state since no unit has been activated.

When the signal which requests control of the bus "BDO" falls (at 180) or when the interface $I_{Ai}$ receives a release order (at 184: signal "LIBR"=1) and when the unit is active (that is, controls the bus "BDO"), a race is initiated if the signal "NDEMA" is active (at 186: signal "NDEMA"=1) or, in other words, one unit requests control of the bus "BDO". A rise of the race signal "NCOUR" (at 190) takes place in synchronism with the end of the last transfer (at 189: signal "NSYNMEM"=0, NON branch).

The foregoing considerations have served to recall known principles in order to gain a more complete understanding of the invention. The method according to the present invention will now be described in detail by reference to that portion of the data-processing system S which relates to the digital data transmission device. The object of the invention is to provide an optimized arrangement for the management of the data exchanges, more specifically within the area of application of a data-processing system as described in the foregoing and especially a system in which the aforementioned resource allocation device is incorporated.

Figure 2:
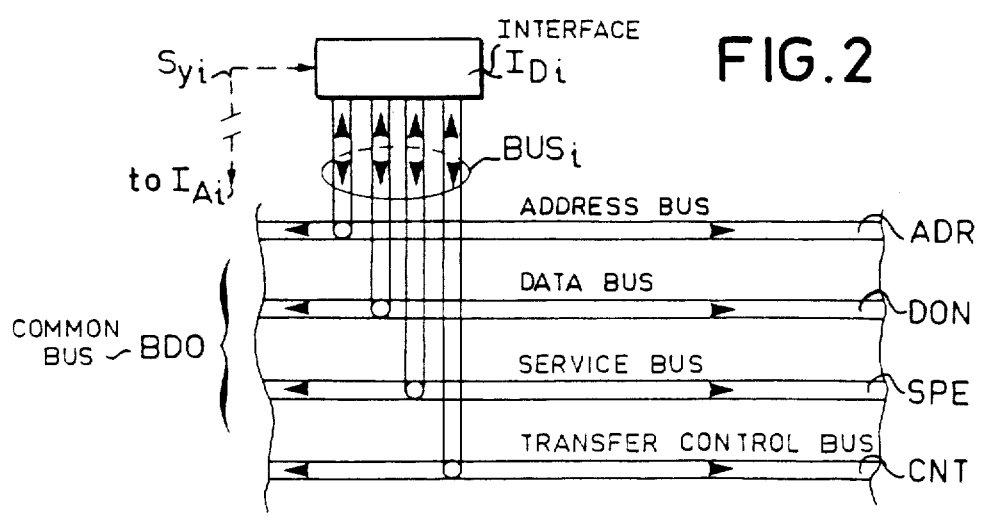
FIG. 2 is a more detailed diagram showing the configuration of the common data-exchange bus employed in the FIG. 1 system.

As has already been described briefly with reference to FIG. 2, one of the most important elements of the data-transmission device is the bus "BDO" to which all the units are connected without exception via an interface $I_{Di}$, whether said units are of the master type or of the slave type. It is worthy of note that any one unit may be alternately a master unit or a slave unit. Bus "BDO" performs four functions which are satisfied in a preferred example of construction by the four elementary buses ADR, DON, SPE and CNT:

addressing function (bus "ADR");
data-transfer function (bus "DON");
transfer management function ("CNT");
and service function (bus "SPE").

The bus thus formed offers in particular the following advantages:

it permits standardized interfaces ($I_{Di}$);
it permits high modularity;
the number of lines of each elementary bus can vary according to the particular application of the system S;
the management is fully decentralized and ensures a high degree of reliability.

It should be recalled that, in general, connecting buses constitute one of the weak points of a data-processing system when evaluating the reliability of such systems. The potential danger of total failure of a system is greatly reduced by decentralized distribution of control elements throughout all the master-type units of the system.

One concrete example of construction will now be described in order to fix ideas:

The address bus "ADR" serves to transmit addresses in a preferred alternative embodiment and comprises a group of thirty-two conductors. The address bus is so arranged as to be capable of asynchronous working on 16-bit or 32-bit words.

The data bus "DON" is a bidirectional bus for exchange of data and comprises in a preferred alternative embodiment a group of thirty-two conductors which can be employed for 16-bit or 32-bit words. Transfers can take place in words split-up into 8, 16, 24 or 32 bits, depending on the state of particular control signals.

The transfer management bus "CNT" comprises a predetermined number of conductors, each of which transmits a binary control signal.

According to one of the principal features of the invention, these control signals permit two principal types of transfer: "master-to-slave transfer" and "master-to-master transfer" in a number of different modes and variants. These transfers entail the use of the address bus "ADR" and the data bus "DON".

The first type of transfer is initiated by setting a first control signal "NAS" into one of the binary states such as "0", for example. This first control signal indicates that the destination address of the data to be transmitted by the master-type unit which has acquired control of the bus "BDO" is stable. In addition to this signal, the transmitting unit positions a read-write control signal "NRWGB", a data validation signal "NOS" and a write-enabling signal for each possible eight-bit byte of the word transmitted by the bus "DON": "BYT 0, BYT 8, BYT 16 and BYT 24".

The receiving unit or in other words the addressed unit must also position signals on the bus CNT, namely an address-clearing signal "NAQAD", this signal being optional in certain modes of transfer which will be specified hereinafter, and a signal "NMRDY" which indicates that the memory of the receiving unit is in readiness.

The definitions of these signals as well as signals which will be discussed hereinafter are grouped together in Table II which is given at the end of this description. In accordance with the convention adopted earlier, the letter N in the first position indicates that the signal is active in the low or logical-zero state.

The second type of transfer is initiated by positioning another control signal "NSERV", the function of which is similar to the signal "NAS" in the first type of transfer. The transmitting unit which has instantaneous control of the bus must also position the signal "NRWGB" and a data validation signal "NDSM", the function of which is similar to the signal "NDS".

So far as concerns the addressed master-type unit which receives transferred data, this unit positions the two clearing signals mentioned earlier, namely the signals "NAQAD and NMRDY".

Finally, the bus "SPE" transmits service signals in order to perform specific functions such as initialization of the system, for example, and may comprise electric supply connections if necessary. These signals are well known to those versed in the art and are not within the scope of the invention. They also depend on the technology involved.

The transfer procedures and protocol in accordance with the two main types will now be considered in detail. A number of different modes and variants are permitted by the method of management of transfers according to the invention.

Transfers can take place in blocks or words in a simultaneous or displaced mode. This is understood to mean that, in the first mode, the destination address is transmitted at the same time as the data to be transmitted. Finally, transmission can take place in a "point-to-point" mode in which a master-type unit to which the bus "BDO" has been allocated transmits data to one other master or slave unit alone or on the contrary in a broadcast mode; in this mode, the master unit which controls the bus simultaneously addresses all the other units which are connected to the bus.

When data transfers by word are performed, the address is emitted during the first part of the transfer and validated by the signal "NAS". The receiving unit thus addressed must be identified and validate the signal "NAQAD" in order to inform the transmitting unit that identification has taken place. The signal "NDS" emitted at the same time (simultaneous mode) or after the signal "NAS" (displaced mode) validates the transfer of data. The receiving unit must reply by means of the signal "NMRDY" as soon as it is capable of transmitting or receiving data. The master is responsible for the signal "NDS" which must rise again only after receiving the signal "NMRDY".

When carrying out data transfers in blocks, a signal "NBLOC" transmitted by the transfer management bus "CNT" validates this type of transfer. The transfer is initialized in the same manner as in the case of a word transfer. The address validated by the signal "NAS" is the block starting address. Each fresh data transfer validated by the signal "NDS" increments the address in all of the receiving units.

When the data transfers are performed in the "point-to-point" mode, validation of the signal "NSERV" indicates that an address is valid on the address bus "ADR" The four low-weight bits indicate the number of the called unit. This unit validates the signal NAQAD for indicating that it has identified itself.

The signal "NDSM" can appear at the same time as the signal "NSERV". The called unit must reply by means of the signal "NMRDY" in order to accept the transmitted data and to terminate the transfer.

Transfers can also be performed in a so-called "broadcast" mode. In some cases, it is in fact useful not to address one unit specially but to request all the master units to record a logical request, for example. In this case, the procedure is identical with point-to-point exchange but one bit of the address ("BCAST") validates the broadcast mode. In this case the units do not take the addressed unit into account. As soon as one unit is capable of making the request, it will clear the broadcast by positioning one address bit ("AQBCAST"). The purpose of this is twofold:
  to notify the calling unit that its call has been recorded;
  to notify the other called units that the request will be satisfied.

The broadcast mode can extend to master transfers to all units, whether of the master type or of the slave type.

To these main data addressing and transfer procedures can be added a particular procedure permitted by the invention in accordance with one of the alternative embodiments, namely the address substitution procedure. By way of example, this procedure permits the arrangement of a virtual memory system by incorporation of a special-purpose unit which is connected to the bus "BDO" via a data interface, namely a processor for managing the table of correspondence of addresses. This offers a number of advantages, in particular at the time of debugging of the system: simulation of interfaces, stopping on bus system address, and so on.

During an exchange, this special-purpose unit analyzes the addresses transmitted by the bus "ADR" and can request control of the address bus "ADR" in order to substitute a new address therein by action of a control signal "NSBAD". After emission of the address by a unit and identification of this latter, the signal "NSBAD" is validated on the bus "CNT" and invalidates the address previously emitted in order to present a new address, whereupon the cycle continues in the normal manner.

This procedure permits direct processing of virtual addresses on the bus and accordingly permits higher modularity of the system.

In the event of a change in configuration of the system S, this special-purpose unit alone must undergo modifications in the address correspondence tables which are associated therewith.

Apart from the unit coupling bus "BDO" described earlier, one of the most important elements of the data-transmission device according to the invention is the interface $I_{Di}$ with which all the units connected to the bus "BDO" are provided and one concrete example of construction of which will now be described in detail.

Figure 5:
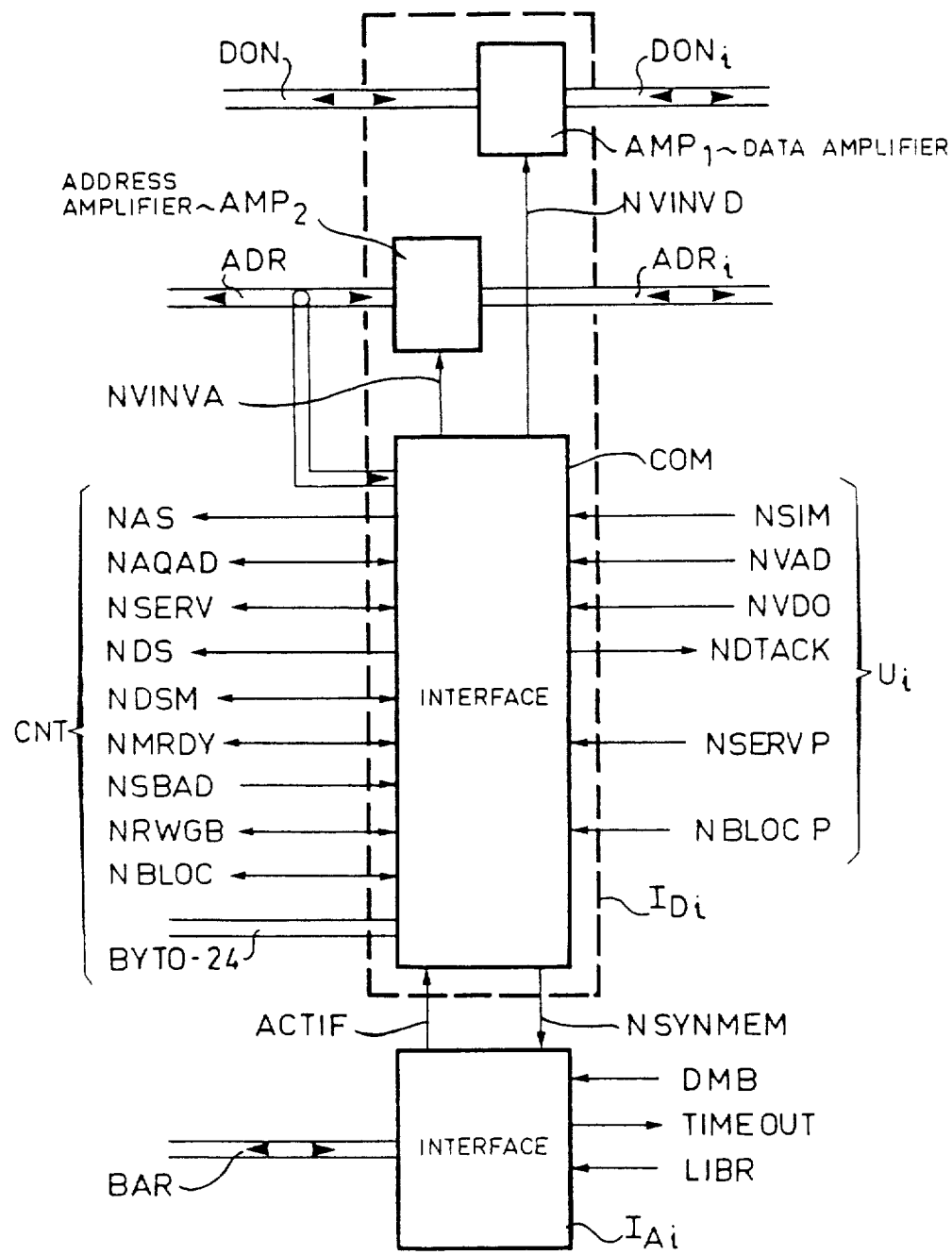
FIGS. 5 and 6 show in greater detail two types of data-exchange interfaces connected to the common bus.

FIG. 5 illustrates a device for coupling a master-type unit to the different buses constituting the channel "BUS" which incorporates the resource allocation device "DAR": interface $I_{Ai}$ and bus "BAR". The invention is more specifically concerned with the data-transfer interface $I_{Di}$.

The interface just mentioned essentially comprises three blocks, namely a control block COM which is coupled to the transfer management bus "CNT", and two blocks AMP 1 and AMP 2 which are coupled respectively to the data bus "DON" and to the address bus "ADR". The two blocks just mentioned are essentially constituted by amplifying and matching circuits for the conversion of logic-signal voltage levels, for example.

The signal-emitting circuits coupled to the different buses are preferably semiconductor elements of the "open collector" type so as to ensure that the low or logical-zero level in the convention adopted is preponderant over the high level and that the resultant logical level is a logical zero when at least one of the emitting circuits positions a signal at the low level.

The control block COM is coupled on one of its faces with the bus "CNT". The block receives and emits the control signals which have been described earlier, namely the signals "NAS, NAQAD", and so on. Each signal is transmitted by a single-lead connection. On the other face, the control block receives and emits signals for controlling the unit which is associated therewith, namely in the case under consideration a master-type unit which can be a processor or a microprocessor, for example. Should it be desired to ensure that all the interfaces $I_{Di}$ are standard, not only in regard to couplings with the different buses but also in regard to the connected units $U_i$, said units may be provided with a coupler for ensuring all the necessary logical and technological compatibilities in the event that the units are of different families and/or technologies.

The control block COM also communicates with the resource allocation interface $I_{Ai}$ by means of two control and synchronization signals which have already been described with reference to the diagram of FIG. 9, namely the signals "ACTIF and NSYNMEN".

Finally, the control block emits two signals "NVINVD" and "NVINVA" which are internal to the data interface $I_{Di}$ for validation or invalidation, said signals being transmitted respectively to the blocks AMP 1 and AMP 2. The control block aforesaid receives from the block "AMP 2" the address signals carried by the bus "ADR". These signals are compared with an internal address such as, for example, a binary number which is stored in a register or wired. This number can be derived from the number which is present on the bus "NSTA" representing the number of the unit $U_i$ and transmitted to the interface $I_{Ai}$. To this end, the control block COM comprises a comparator formed, for example, by EXCLUSIVE-OR logical gates or by a commercially available module.

The signals emitted or transmitted to or from the unit $U_i$ are transmitted to the interface $I_{Ai}$.

The signals emitted or transmitted to or from the unit $U_i$ which is associated with the interface comprise a sequencing-mode indication signal. This indication is provided by the signal "NSIM". The logical state of this signal governs the operation of the interface $I_{Di}$ according to two modes of chronology of transfer to the bus as mentioned earlier:

the simultaneous mode: the address and data cycles are performed in parallel;

and the displaced mode: the address cycle necessarily precedes a data cycle. This mode makes it necessary for the receiving units to store the addresses in memory.

In this case, the control block COM must comprise or be associated with a memory. This storage permits the operation known as direct memory access (DMA). This mode of sequencing makes it possible to ensure higher reliability of the system by providing better protection of the bus insofar as the address amplifier AMP 2 and data amplifier AMP 1 never operate simultaneously. The sequencing mode also permits multiplexed operation by combining the two buses into a single unit, especially for extending the address field by increasing the possible number of bits of the address word by means of the number of connections with which the bus "DON" is provided.

The other signals received from or transmitted to the associated unit will be discussed in detail in the description relating to the operation of the data interface $I_{Di}$ which is illustrated in the diagrams of FIGS. 11 to 16.

The buses "SPE" and the service signals transmitted by the bus are not shown in FIG. 5 for the sake of enhanced simplicity since they do not come within the scope of the invention and are not essential to good understanding of the invention.

Figure 6:
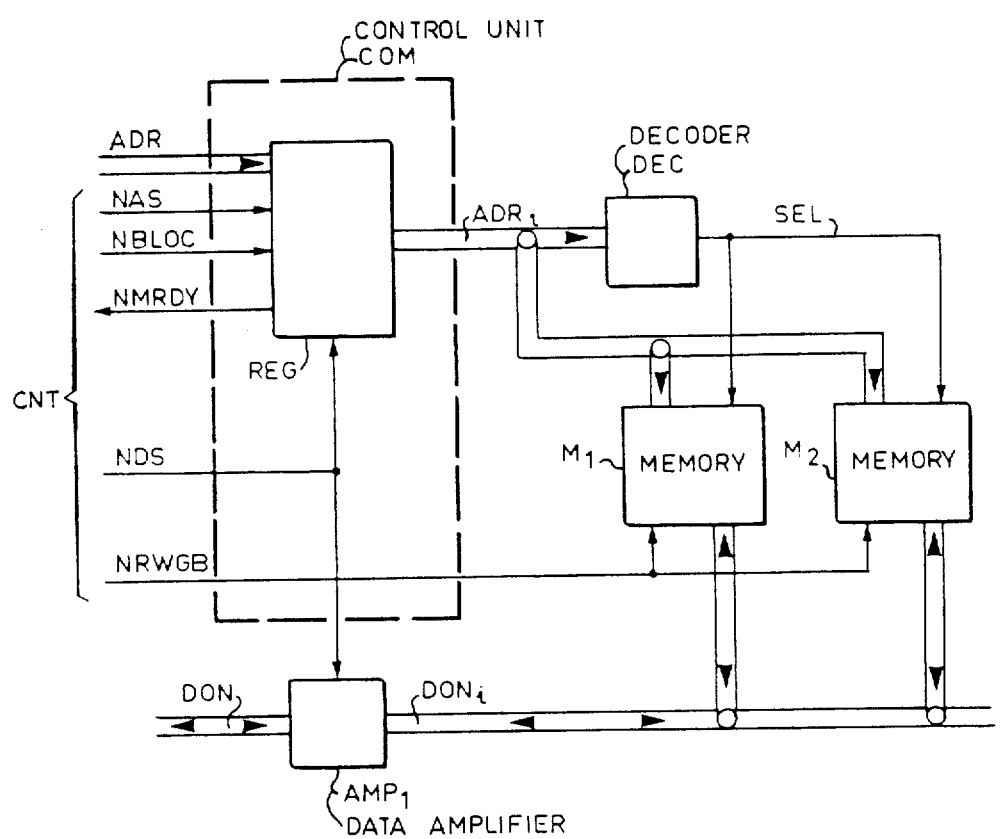

When the data interface $I_{Dx}$ is coupled to a slave-type unit $U_x$, it is possible to simplify the said interface if so desired. FIG. 6 illustrates one example of an interface of this type. In the example under consideration, the unit $U_x$ consists of a bank of random-access memory cards, two of which are illustrated in FIG. 6, namely the cards $M_1$ and $M_2$.

The block AMP 2 (shown in FIG. 5) is dispensed with. On the other hand, the block AMP 1 comprises a storage unit of the buffer memory type, the unit being connected to the internal data bus "DONi" to which the read/write terminals of the memory cards are coupled.

The control block COM must comprise an address recording and identification circuit REG.

A part of the address bits is compared with an internal code in much the same manner as in the procedure described earlier with reference to FIG. 5 and the addressed unit $U_x$ is activated. The address bits then serve to address particular address positions in the memory cards on an internal bus "ADRi" in order to read or write therein data which are transmitted by the internal bus "DONi". The block COM further comprises a counting circuit which can increment the address recorded by the circuits REG on the leading edge of the signal "NDS". Finally, the block COM generates the signal "NMRDY" or data-clearing signal.

The only control signals which are essential for the operation of the interface $I_{Dx}$ are the signals "NAS, NDS, NBLOC and NRWGB", the last-mentioned signal being utilized for reading or writing control.

Finally, a decoding circuit DEC incorporated in the block COM or associated with the memory cards $M_1$, $M_2$ as shown in FIG. 6 emits signals "SEL" for selecting one of the memory cards derived from the address signals.

The operation of the various interfaces will now be described in the general case with reference to the diagrams of FIGS. 11 to 16. In all cases, transfers take place in an asynchronous manner.

Figure 11:
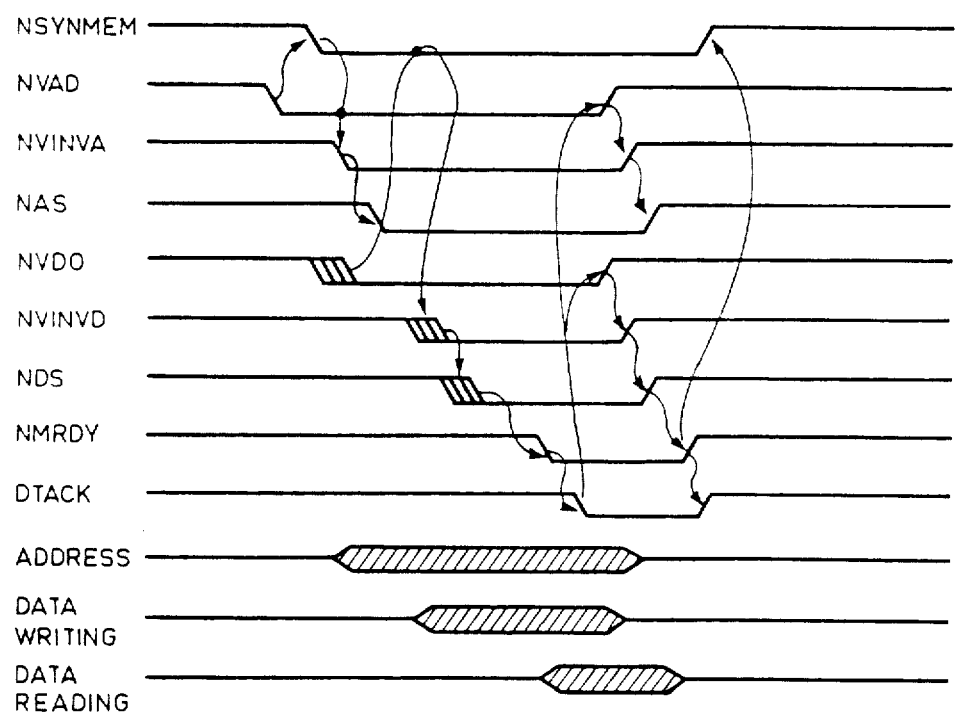
FIGS. 11 to 15 are diagrams illustrating a number of operating modes of the device according to the invention.

The diagram of FIG. 11 illustrates a master-slave transfer ($U_i$ to $U_x$) in the simultaneous word-mode. The active unit $U_i$ transmits the signal "NVAD" to the associated interface $I_{Di}$ in order to start a transfer sequence. The interface transmits the signal "NVINVA" to the block AMP 2 in order to enable the address amplifiers and then emits the signal "NAS". At the same time, the unit emits the signal NVDO in order to request transfer of the data. Without awaiting clearing of the address (simultaneous mode), the interface transmits the signal "NVINVD" to the block AMP 1 in order to enable the amplifiers of this latter to validate the data on the bus "DON" and transmits the signal "NDS" to the bus "CNT" in the writing mode. After decoding of the addresses and satisfying the access times, the addressed unit responds by emitting the signal "NMRDY". After receiving said signal, the interface transmits the signal "DTACK" to the unit $U_i$ in order to unblock and terminate this transfer cycle. The unit $U_i$ then removes the signals "NVAD" and "NVDO" in order to unblock the interface prior to a further transfer. Upon deactivation of the last of these two signals (NVAD, NVDO), the interface records the signals "NVINVA, NAS, NVINVD and NDS". With respect to the leading edge of the signal "NDS", the receiving unit depositions the signal "NMRDY" The signal "NSYNMEM" which includes a transfer on the bus "DON" (utilized by the resource allocation interface $I_{Ai}$) is validated immediately upon reception of the signal "NVAD" and invalidated when the addressed unit removes the data-clearing signal ("NMRDY").

Figure 12:
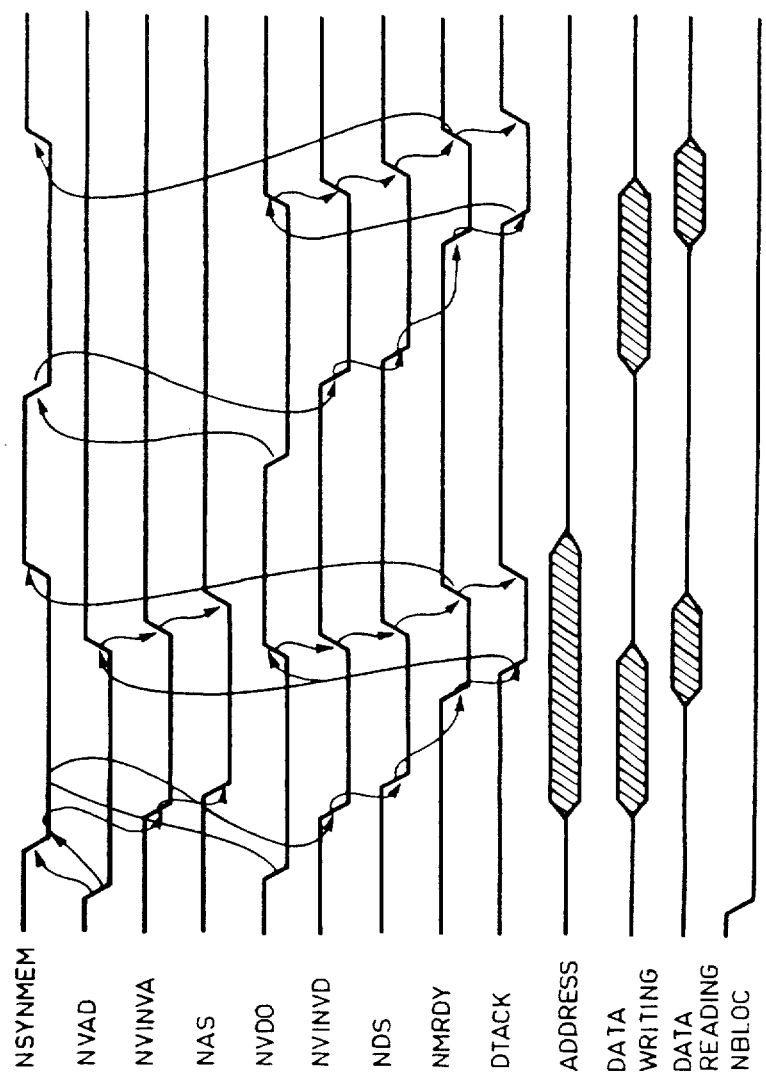

The diagram of FIG. 12 illustrates a transfer by data blocks under the same conditions as before.

This mode is activated by the internal signal "NBLOCP" which is positioned by the unit $U_i$ and transmitted by "NBLOC" on the bus "CNT". Initialization of transfer is identical with that of the word transfer. After the first transfer, the interface awaits a further activation of the signal "NVDO" by the unit $U_i$ in order to carry out the following data transfer. The unit $U_i$ stops this mode by no longer activating the signal "NVDO" and by depositioning the signal "NBLOCP".

The data cycles take place as follows :

Activation of the signal "NVAD" validates the signal "NSYNMEM". Opening of the amplifiers of the block AMP 1 is controlled by the signal "NVINVD". This signal is active as soon as the signal "NSYNMEM" is validated. Activation of the signal "NVINVD" permits transmission of the data validation signal "NDS". After a sufficient period of time corresponding to the time required by the addressed unit $U_x$ to position the information on the data bus "DON" (reading) or for recording the items of information which are present (writing), the master unit $U_I$ transmits the signal "NMRDY" to the interface $I_{Di}$. A clearing signal is transmitted by the interface to the unit $U_i$ by means of the signal "DTACK". The unit $U_i$ then invalidates the signal "NVDO" for deactivating the signals "NVINVD, NDS", then "NMRDY" and "DTACK", whereupon the rise of the signal "NMRDY" inhibits the signal "NSYNMEM". The transfer is then completed.

In this mode, the addresses must be recorded within the receiving unit $U_x$ Loading is performed on the leading edge of the signal "NAS". The address is incremented at each leading edge of the signal "NDS". The signal "NBLOC" informs the receiver that the next transfers will be of the block type.

Figure 13:
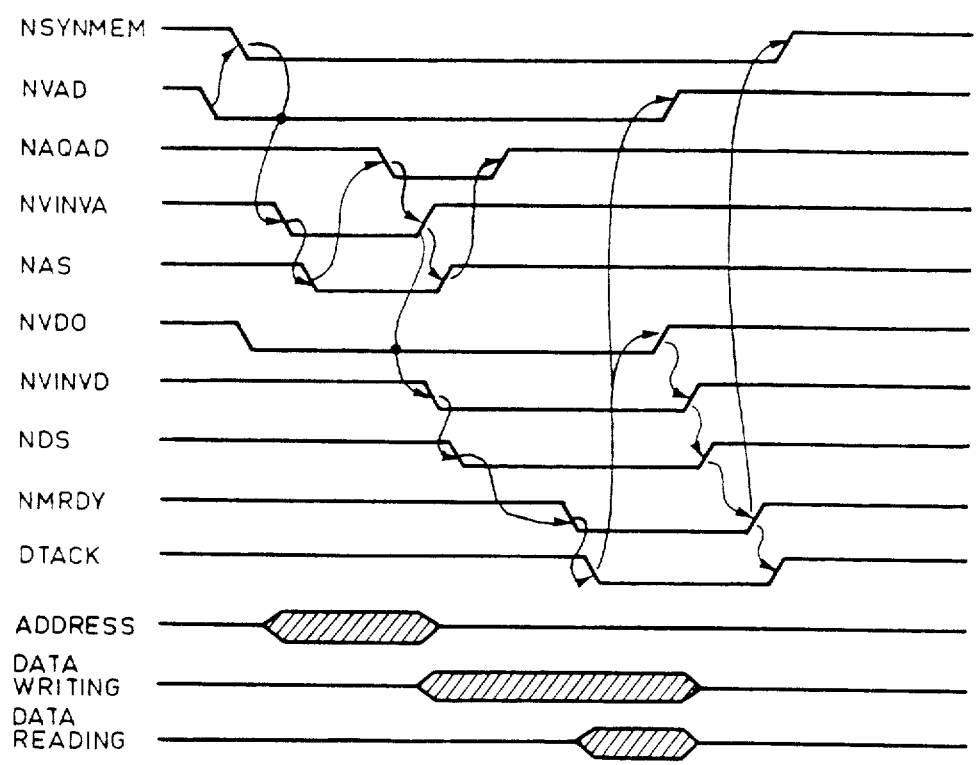

The diagram of FIG. 13 illustrates a transfer in displaced word-mode. This mode necessarily entails the need for storage of the addresses within the receiving unit. Loading is performed on the leading edge of the signal "NAS". An interface which permits this mode has been described earlier with reference to FIG. 6.

The active unit $U_i$ transmits the signal "NVAD" to the interface $I_{Di}$ so as to start a transfer sequence. The interface $I_{Di}$ transmits the signal "NVINVA" to the unit $U_i$ so as to permit opening of the address amplifiers AMP 2 and then emits the signal "NAS". At the same time, the processor emits the signal "NVDO" in order to request data transfer. The interface $I_{Di}$ awaits clearing of the address emitted by the receiver as effected by the signal "NAQAD" (displaced mode). Upon reception of this signal, the interface closes the address amplifiers (by means of the signal "NVINVA") and records the signal "NAS", then transmits the signal "NVINVD" to the unit $U_i$ in order to enable this latter to validate the data on the bus "DON" in the writing mode and finally transmits the signal "NDS" onto the bus "CNT". After satisfying the access times, the receiver $U_x$ responds by emitting the signal "NMRDY". After receiving the signal, the interface $I_{Di}$ transmits the signal "DTACK" to the unit $U_i$ in order to unblock and terminate this transfer cycle. The unit $U_i$ then removes the signals "NVAD and NVDO" in order to unblock the interface $I_{Di}$ prior to a further transfer. Upon deactivation of the last of these two signals ("NVAD, NVDO"), the interface $I_{Di}$ records the signals "NVINVD and NDS". With respect to the leading edge of the signal "NDS", the receiver $U_x$ depositions the signal "NMRDY". The signal "NSYNMEM" which includes a transfer onto the bus "BDO" and is utilized by the resource allocation interface $I_{Ax}$ is validated immediately upon reception of the signal "NVAD" and invalidated when the receiver $U_x$ withdraws the dataclearing signal "NMRDY".

Figure 14:
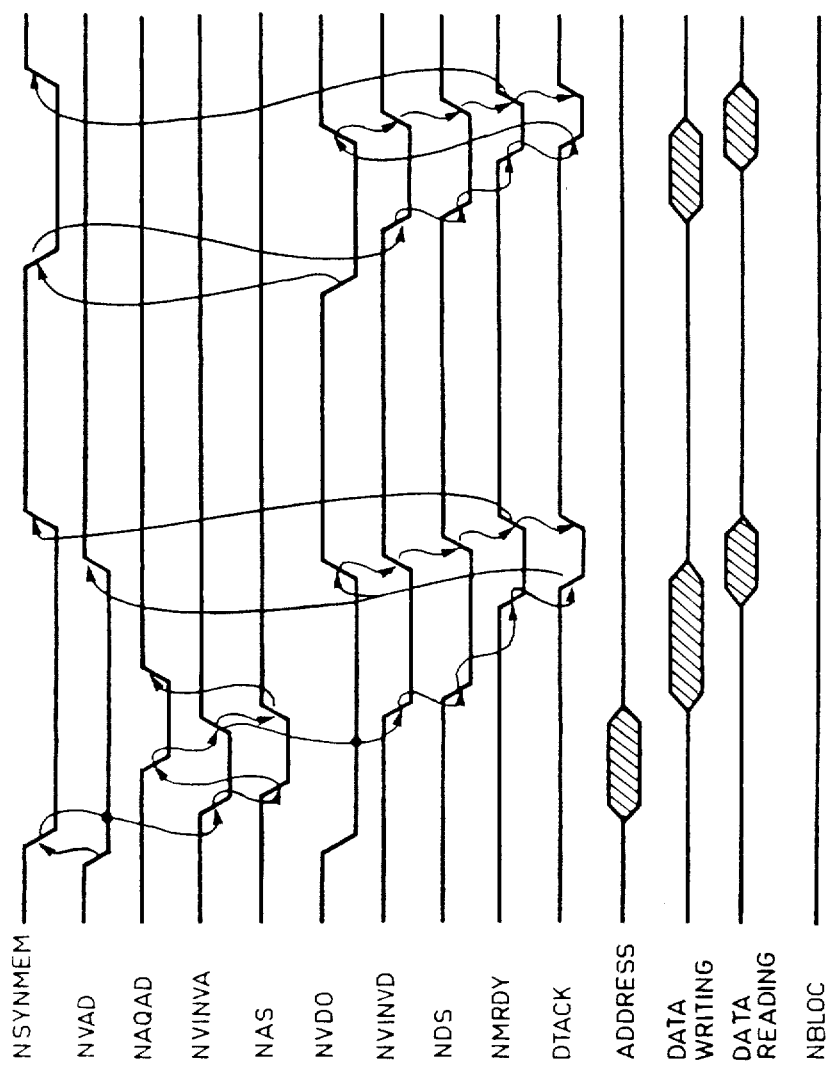

The block transfer in displaced mode is illustrated in the diagram of FIG. 14.

This mode is activated by the signal "NBLOCP" which is positioned by the master unit $U_i$ Initialization of the transfer is identical with that of the word transfer. After the first transfer, the interface $I_{Di}$ awaits a further activation of the signal "NVDO" by the unit $U_i$ in order to carry out the following data transfer. The unit $U_i$ stops this mode by no longer activating the signal "NVDO" and by depositioning the signal "NBLOCP".

The data cycles take place as follows : activation of the signal "NVDO" validates the signal "NSYNMEM" (utilized by the interface $I_{Ai}$). Opening of the amplifiers of the block AMP 1 is controlled by the signal "NVINVD". This signal is active as soon as the signal "NSYNMEM" is validated. Activation of the signal "NVINVD" permits transmission of the data validation signal "NDS". After a sufficient period of time corresponding to the time required by the receiver $U_x$ to position the items of information on the data bus (reading) or to record the items of information which are present (writing), the receiver transmits the signal "NMRDY" to the interface $I_{Di}$. This latter transmits the clearing instruction to the unit $U_i$ on "DTACK". This latter then invalidates the signal "NVDO" for deactivating the signals "NVINVD, NDS", then "NMRDY and DTACK", whereupon the rise of the signal "NMRDY" inhibits the signal "NSYNMEM". The transfer is then ended.

In this mode, the addresses must be recorded in the receiver $U_x$. Loading is performed on the leading edge of the signal "NAS". The address is incremented at each leading edge of the signal "NDS". The signal "NBLOC" informs the receiver that the next transfers will be of the block type.

Master-to-master transfers take place in a manner which is similar to the procedure described in the foregoing.

Exchange of the point-to-point type or in other words from a master-type unit $U_i$ to which the bus "BDO" has been allocated to one other master-type unit $U_j$ is selected by setting the signal "NSERVP" at the input of the interface $I_{Di}$ in the logical "zero" state. The function of the signals "NSERV and NDSM" as a function of the signals "NVAD and NVDO" is identical with that of the signals "NAS and NDS" irrespective of the sequencing mode (simultaneous or displaced mode).

Validation of the signal "NSERV" indicates that an address is valid on the address bus "ADR". The four low-weight bits indicate the number of the called unit $U_j$. This unit validates the signal "NAQAD" which indicates that it has identified itself The signal "NDSM" can appear at the same time as the signal "NSERV". The called unit $U_j$ must respond by means of the signal "NMRDY" in order to accept the data and in order to end the transfer In the broadcast mode, the master unit $U_i$ must set the signal "NBCAST" at the input of the interface $I_{Di}$ in the logical "zero" state In consequence, the exchanges will be in synchronism with the "BCAST" signal transmitter if no unit responds (signal "NMRDY"). In other words, it is the first unit $U_i$ which records the broadcast which synchronizes the transfer In a preferred embodiment, the receiving unit $U_j$ is also of the master type but this mode of transfer is also generally applicable in the case of master-type transfers to all units whether of the master or slave type.

These different protocols, procedures and modes of transfer are summarized in the flow diagrams of Figs.- 16A to 16C. FIG. 16 illustrates the interconnection of these FIGS. 16A to 16C. These flow diagrams also show tests relating to elementary transfer time-duration. A test is continuously performed with a view to evaluating the time which has elapsed from the beginning of each transfer When the elapsed time interval is longer than a predetermined value T, there is an error detection. This type of procedure is known to those versed in the art and does not need to be described further. To this end, use can be made of a time base such as, for example, a monostable multivibrator initialized by the signal "ACTIF" emitted by the resource allocation interface $I_{Ai}$.

Finally, in a particular alternative embodiment as has already been recalled, the invention permits address substitutions directly on the bus "BDO". This alternative embodiment therefore permits virtual addressing since the bus is wholly transparent.

Figure 7:
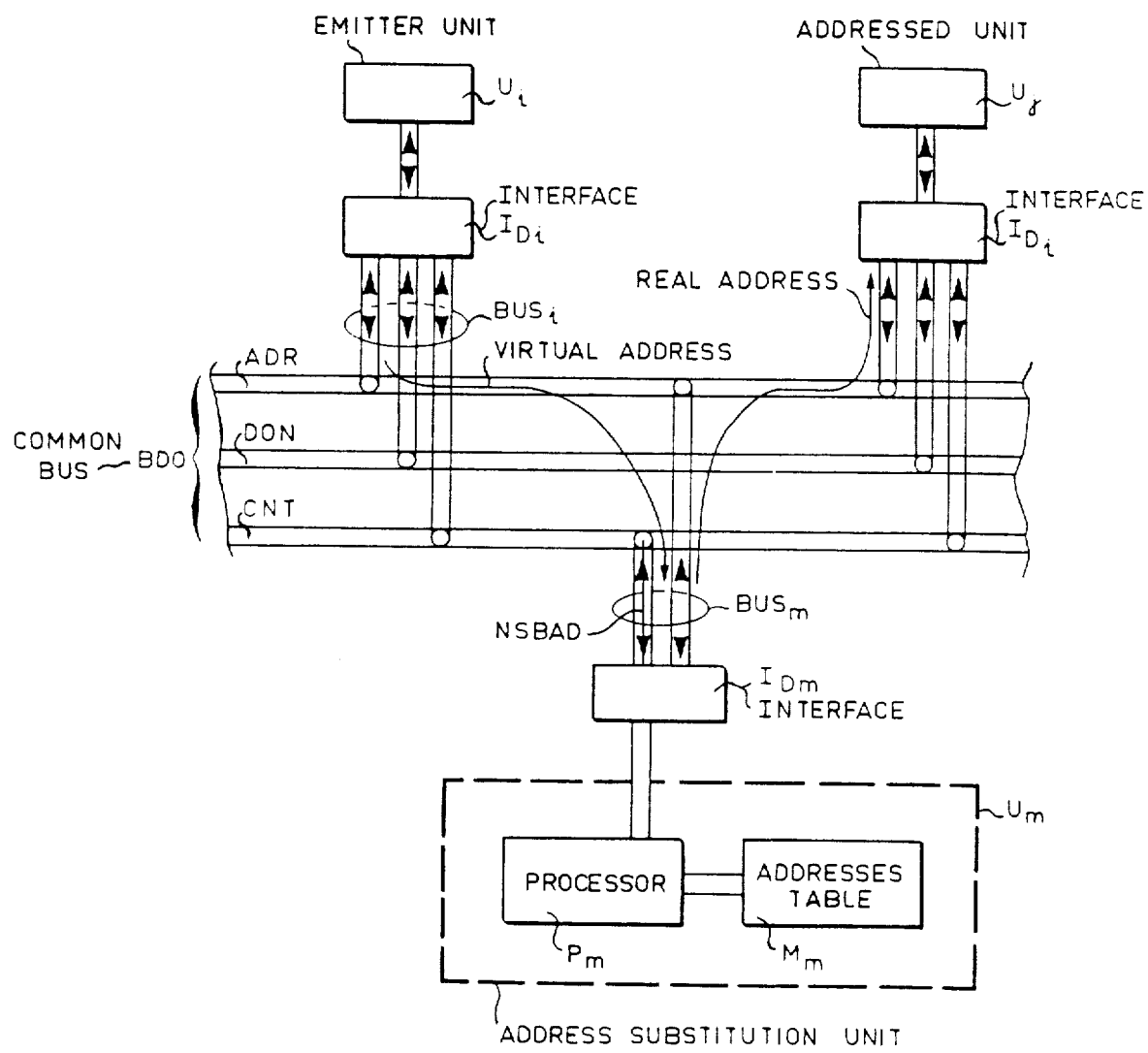
FIG. 7 illustrates an alternative embodiment of the device according to the invention.

With this objective, the system is provided in a concrete example of construction with a special-purpose slave-type unit $U_m$ as illustrated in FIG. 7. The unit $U_m$ is essentially constituted by a processor $P_m$ associated with devices $M_m$ for storing address conversion tables. This processor supervises the addresses transmitted by the address bus "ADR". When the emitted address does not correspond to a real address or in other words to a unit $U_i$ address which is physically connected to the coupling bus "BDO", the interface $I_{Dm}$ associated with the unit $U_m$ validates the signal "NSBAD" on the transfer management bus "CNT" in order to request invalidation of the address previously emitted, computes a new address and in turn transmits this computed address to the bus "ADR".

The first portion of the transfer cycle is the beginning of a transfer of the "master $U_i$ to slave" type, the slave being the special-purpose unit $U_m$ and the cycle is continued in the form of a transfer from the same master $U_i$ to any one of the units of the system connected to the bus "BDO", the physical address of which has been computed by the process $P_m$ from the virtual address previously emitted and substituted on the address bus ADR for the virtual address. All the types and modes of transfer described in the foregoing can be carried out during this second portion of the cycle.

In the prior art, the address is computed either at the start by the emitting unit or its interface or at the arrival under the same conditions or in other words by all the units connected to the bus "BDO" so as to ensure that one of these units identifies its address after conversion of the virtual address to a real or physical address. This entails the need for a modification of the address conversion tables of all the units in the event of reconfiguration of the system.

In FIG. 7, the bus "SPE" has not been shown. The interface $I_{Dm}$ is connected only to the address bus "ADR" and transfer management bus "CNT", especially by means of the data-link signal "NSBAD" in the case of this latter, said signal being emitted by the interface $I_{Dm}$ and transmitted to all the interfaces associated with the mastertype units in order to invalidate the address emitted by the unit $U_a$ which has instantaneous control of the bus "BDO".

In an alternative form (not illustrated), the function of special-purpose unit may be also be performed by one of the regular units connected to the bus "BDO". In this case, if the system S undergoes a reconfiguration, only the address conversion tables associated with these units are to be modified. One of the tasks allotted to this unit is the address conversion when the address carried by the address bus "ADR" is outside the field of physical addresses assigned to the units $U_1$ to $U_n$ which are connected to the bus "BDO". This is the case, for example, if q is the number of address bits and if $2^q$ is greater than n numbers of real addresses corresponding to connected units.

Figure 15:
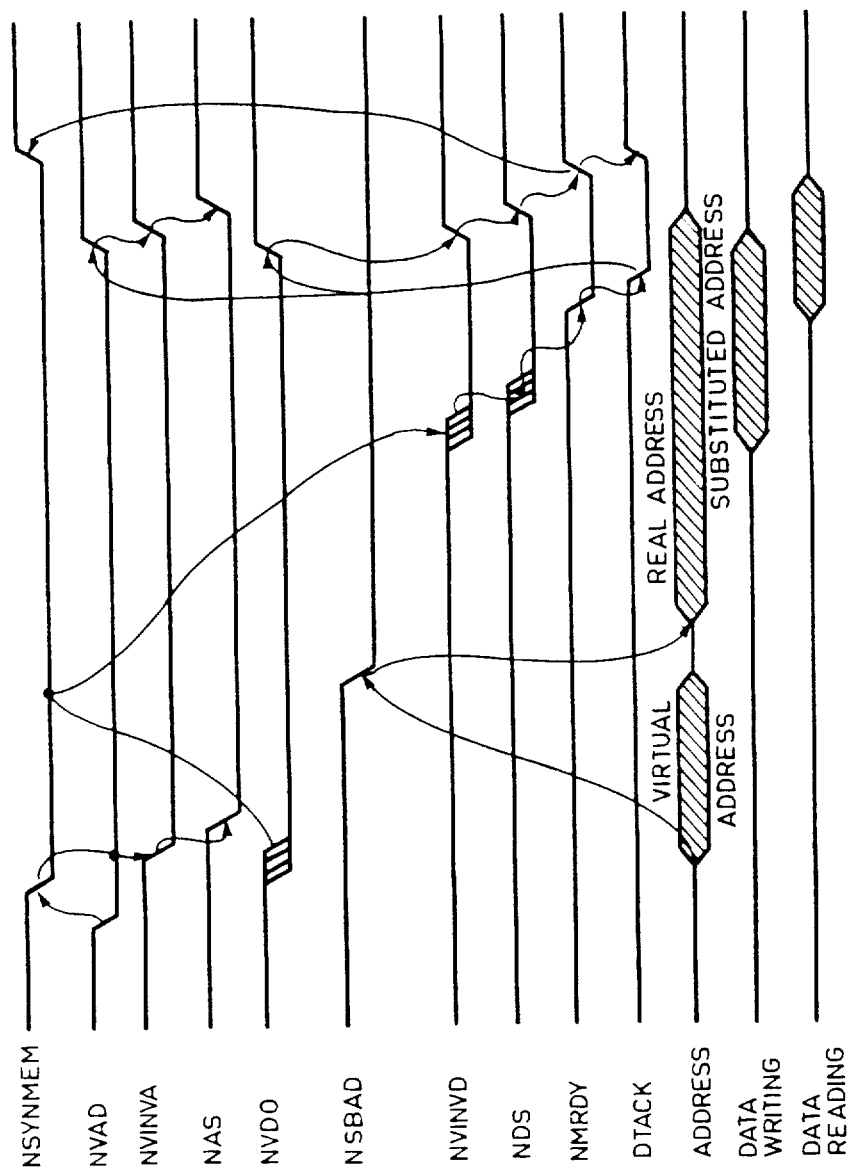

The diagram of FIG. 15 illustrates a case of transfer of the master-to-slave type in the simultaneous word-mode. Except for identification of an address outside the field of real addresses, emission of the invalidation signal "NSBAD", computation of a new address and emission of said new address, the other steps of the transfer take place in a manner which is similar to the procedure described with reference to FIG. 11. The other modes of transfer can be described in the same manner with reference to FIGS. 12 to 14.

The different electronic circuits constituting the data interfaces $I_{Di}$ to $I_{Dn}$ which are necessary in order to satisfy the logical conditions, chronologies and storages described with reference to the diagrams of Figs.11 to 15 as well as the flow diagram of FIG. 16 can be constructed in accordance with many logic circuit diagrams which are within the capacity of anyone versed in the art. The logic circuit diagrams depend on the specific technology adopted for the actual design of the device according to the invention.

In order to help fix ideas by means of an example which is not given in any limiting sense, however, a fast technology of the "Schottky" type may be adopted.

In the case of combinational logic functions, it is possible in this area of application to make use of logical gates which perform the logical functions "AND, OR, NAND and NOR" in their customary acceptations. It is also possible to employ inverters with a view to providing the logical complement of a binary signal which is present on their inputs. In accordance with conventional practice, the high level is the logical "1" as represented by a voltage of +5V within the field of the technology which has been chosen, the low level being the logical "0" represented by a zero voltage.

D-type flip-flops or bistable multivibrators can also be employed for the sequential logic functions and the stages of memory registers. The configuration of these devices as well as the truth table and waveform diagram of a bistable multivibrator of this type may be found, among other publications, in the work entitled "De la Logique Câblée aux Microprocesseurs" ("From Wired Logic to Microprocessors") by Bernard et Al., in vol. 1, chapter X(4), pages 136–138 (published by Eyrolles, Paris, 1979).

It is of interest to recall the operating principles of this device. A bistable multivibrator of this type comprises a data input D, a clock input H, a preset input Pr, a clear input Cl and two outputs, namely a real output Q and a reversed output Q̄. The inputs Pr and Cl are asynchronous and reset the multivibrator to "1" or "0" respectively, independently of the clock signals. The synchronous mode is defined by the data input D and the clock input H. The multivibrator transcribes the input D after the appearance of a leading edge of the clock signal applied to the input H, taking into account a recording delay of the order of a few nanoseconds in the case of the technology which has been adopted.

It must also be recalled that the logic circuits whose outputs are connected in parallel to the lines constituting the bus "BDO" are of the so-called "open collector" type. It must in fact be ensured that the low level is preponderant with respect to the high level.

It may be stated by way of conclusion that, by means of the method according to the invention and the device for carrying out said method, units derived from different families and/or different technologies and capable of operating in different cycles and chronologies can be accommodated within one and the same system. The method and device according to the invention ensure fully decentralized management of asynchronous data transfers between these units via a coupling bus. The units can be either of the master type or of the slave type and may include in particular a number of independent processors.

The transfers can take place in accordance with three addressing modes which are differentiated simply by means of the following set of control signals:
- master-slave transfer : signals "NAS-NDS";
- master-to-master transfer : signals "NSERV-NDSM";
- transfer from master to all units by means of a supplementary signal "BCAST".

The chronology of exchanges can also take place in two modes : addresses and data in either the simultaneous or the displaced mode.

Finally, in a particular alternative embodiment, substitutions of addresses can be carried out directly on the address bus "ADR" during the transfer procedure.

It is apparent that, in actual practice, the transmission device contemplated by the invention can be designed according to different architectures within the capacity of those skilled in the art since the constructional example described in the foregoing has been given solely by way of illustration without thereby implying any limitation in regard to the scope or the spirit of the invention.

TABLE I

| | |
|---|---|
| ACTIF: | signal indicating that the resource has been allocated to a unit $U_i$. This signal is synchronized with the clock $H_i$ of the unit $U_i$ if the number NACT corresponds to this unit and is synchronized with the end of race in all other cases. The signal ACTIF is depositioned when $U_i$ releases the resource after a fall of the signal DMB; the value of the active signal does not change when an operation is in progress. |
| ADR: | bus providing a connection between the data exchange interface $I_{Di}$ for transmitting address words. |
| $BA_i$: | local bus for coupling a unit $U_i$ to its resource allocation interface $I_{Ai}$. |
| BAR: | bus for coupling the resource allocation interfaces $I_{Ai}$, comprising the buses PRIO, NACT and the signal links NCOUR, NDEMAN and PERSO. |
| BDO: | connecting channel for exchange of data between the units $U_l$ to $U_n$, comprising the buses ADR, CNT, DON and SPE. |
| $BUS_i$: | local bus for coupling a data exchange interface $I_{Di}$ with the channel BUS. |
| CNT: | bus providing a connection between the data exchange interfaces $I_{Di}$ to $I_{Dn}$ for transmitting data-transfer management signals between the units $U_l$ to $U_n$. |
| DAR: | resource allocation device. |
| DMB: | resource request signal which serves for example to request the bus BDO, said signal being active in the high state and continuously maintained as long as the request has not been satisfied. |
| DON: | bus providing a connection between the data exchange interfaces $I_{Di}$ for transmitting data words. |

TABLE I-continued

| | |
|---|---|
| $H_i$: | clock signals of a unit $U_i$ having a frequency $f_i$. |
| $2H_i$: | clock signals transmitted to the interface $I_{Ai}$ by the unit $U_i$ and having a frequency $2f_i$. |
| $I_{Ai}$: | resource allocation interface associated with the unit $U_i$. |
| $I_{Di}$: | data exchange interface associated with the unit $U_i$. |
| LIBR: | signal for releasing the resource via the interface $I_{Ai}$ and generated by the unit $U_j$, said signal being active in the high state. |
| NCOUR: | signal for starting a race; said signal is active in the low state, blocks all other requests after a signal rise, and is generated by a logic element of the "open collector" type. |
| NDEMA: | resource request signal for requesting the bus BDO, for example, said signal being active in the low state and positioned by all the units. |
| NACT: | bus providing a multiple connection between the resource allocation interfaces $I_{A1}$ to $I_{An}$ for transmitting the complement of the number of the race-winning unit $U_j$ which is generated by logic elements of the "open collector" type. |
| NSTA: | number assigned to each unit $U_j$. |
| NSYNMEM: | periodic signal generated by the data exchange interfaces $I_{D1}$ to $I_{Dn}$, said signal being active in the low state and having a time-duration equal to one data transfer on the channel bus on the initiative of a unit $U_j$; said signal is employed for synchronizing the interface $I_{Ai}$ which is associated with the unit $U_j$. |
| PERSO: | signal which indicates that there is no active unit; said signal is active in the high state and generated by a logic element of the "open collector" type. |
| PRIO: | bus providing a multiple connection between the resource allocation interfaces $I_{A1}$ to $I_{An}$ and transmitting a word for identifying the unit which requests the highest-priority resource, and generated by logic elements of the "open collector" type. |
| S: | system comprising the units $U_1$ to $U_n$. |
| SPE: | bus providing a connection between the data exchange interfaces $I_{D1}$ to $I_{Dn}$ for transmitting service signals. |
| TIMEOUT: | signal for indicating the maximum time interval allocated to one unit $U_j$ if other units have requested control of the resource. |
| $U_i$: | unit of the system S of order i (1 to n) consisting of a processor or peripheral unit which is capable of competing with at least one other unit $U_1$ to $U_n$ for gaining access to a common resource. |

TABLE II

| | |
|---|---|
| BYT0–BYT8 BYT16–BYT24: | signals for validating each of the possible eight-bit bytes of the data word transmitted by the bus DON. |
| NAS: | when a master-slave dialog is established, this signal indicates that an address is present and stable on the bus ADR. |
| MAQAD: | signal received by the interfaces $I_{Di}$. The receiving units $U_i$ indicate by means of this signal that the address has in fact been received and decoded. It is employed only in the displaced mode. |
| NBCAST: | the signal is activated by a master unit for notifying the interfaces $I_{Di}$ that the following transfer is a broadcast to all the units connected to the channel BUS. |
| NBLOC: | signal transmitted by a unit $U_j$ which repeats the signal NBLOCP. |
| NBLOCP: | signal positioned by a master unit $U_j$; this signal indicates that the following transfers will be performed in the "block" mode and is transmitted to the associated interface $I_{Di}$. |
| NDS: | signal which validates the data on the bus DON at the time of a master-slave dialog. |
| NDSM: | signal which is identical with NDS at the time of a master-to-master dialog. |
| NDTACK: | signal emitted by a data interface $I_{Di}$ and transmitted to the associated unit $U_i$ for informing it that the data transfer has taken place. |
| NMRDY: | signal received by a transmitting interface $I_{Di}$. The receiving units $U_x$ indicate that the data item is stable (reading) or that the data item has been acquired (writing). |
| NRWGB: | signal for selectively controlling the writing mode or the reading mode in an addressed slave unit. |
| NSERV: | identical with NAS in a master-to-slave dialog; repetition of the signal NSERVP emitted by the unit $U_j$ and transmitted to the associated interface $I_{Di}$. |
| NSERVP: | signal received by the interface $I_{Di}$ and positioned by a unit $U_j$ for indicating that the following transfer is a master-to-master transfer. |
| NSIM: | indicates the operating mode chosen for utilization of the interface $I_{Di}$. NSIM = 0: simultaneous mode, the addresses are delivered to and maintained on the bus ADR until the data have been received. NSIM = 1: displaced mode, the data must be delivered only after reception of the address clearing signal (NAQAD). |
| NVAD: | signal transmitted to an interface $I_{Di}$ by the associated unit $U_i$; this signal indicates that an address is present and stable at the input of the address amplifiers AMP 2. |
| NVDO: | signal transmitted by a unit $U_j$ and received by its associated interface $I_{Di}$; this signal initializes a data transfer corresponding to an address which has already been sent. |
| NVINVA: | signal activated by an interface $I_{Di}$ upon reception of the signal NVAD; must be employed for validating/invalidating the address amplifiers AMP 2 of the transmitting unit. |
| NVINVD: | signal activated by an interface $I_{Di}$ upon reception of the signal NVDO; must be employed for validating/invalidating data amplifiers AMP 1 of the transmitting unit. |
| NSBAD: | signal for prohibiting transmission of address signals to the bus ADR; this signal does not affect data transfer. |

What is claimed is:

1. In a data-processing system having a plurality of units and a data-transmission channel of the multiple-conductor bus type to which all said units are connected through interface circuits, at least one such unit being a master-type unit which is capable of requesting and acquiring instantaneous control of the transmission channel in order to address at least one other unit of said system and to initiate exchanges of data in said channel, and at least one such unit being a slave-type unit which can be addressed by said master-type unit, and a device for granting instantaneous control of said channel to said master-type unit which has requested instantaneous control of said channel, a method of transmitting digital data between said units comprising the steps of:

requesting, by said master unit, control of said channel;

granting, by said granting device, control of said channel to the master unit requesting control;

providing, by the master unit having obtained control of the channel, control information in the form of control signals on said channel by causing three control signal lines of said channel to assume desired states defining one of three possible different addressing modes, the addressing modes being mutually exclusive, each said control signal line being capable of assuming either a first or a second binary state, the status of the three control signal lines defining the addressing modes as follows:

setting the first control signal line to said first binary state defining an addressing mode permitting a point-to-point data transfer between the master-type unit which has acquired instantaneous control of the transmission channel and a slave-type unit addressed by said master-type unit;

setting the second control signal line to said first binary state defining an addressing mode permitting a point-to-point data transfer between the master-type unit which has acquired instantaneous control of the transmission channel and a second master-type unit addressed by the first master-type unit;

setting the third control signal line to said second binary state simultaneously with setting the first or second control signal line to said second binary state defining an addressing mode permitting a general broadcast data transfer from the master-type unit which has acquired instantaneous control of the transmission channel to at least all the other master-type units of said system, all of said units being addressed simultaneously;

addressing one or more units in accordance with the addressing mode defined; and transmitting digital data from the master unit having acquired control of the channel on said channel in accordance with the addressing mode defined.

2. A method according to claim 1, wherein when the general broadcast addressing mode is initiated, transferring data between the master-type unit which has acquired control of the transmission channel and all the master-type and/or slave-type units of said system.

3. A method according to claim 1, wherein the addressing step includes transmitting, in conjunction with control signals on said control signal lines, an address word for identifying at least one unit to receive said digital data, the address word having q bits each of which can assume either a first or a second binary state wherein q is a whole number and $2^q$ is at least as large as the number of units constituting said system.

4. A method according to claim 3 wherein, $2^q$ is larger than the number of units connected to the data transmission channel, and wherein the addressing step comprises the steps of:

generating, by the master unit having acquired control of the channel, a virtual address word, and then substituting a real address word for the virtual address word by monitoring, by a unit dedicated to that purpose, the virtual address word transmitted on said channel and comparing the virtual address word with listings of a virtual address table of the dedicated unit, and at the time of a positive comparison, determining a real address word of one of the other units connected to the transmission channel corresponding in said virtual address table to the virtual address word and transmitting by the dedicated unit the real address on the channel in place of the virtual address word.

5. A method according to claim 4 wherein the step of substituting comprises the step of the interface circuit associated with the dedicated address monitoring unit transmitting a binary-type signal at the time of a positive comparison, said signal being transmitted through the transmission channel to the master-type unit which provided said virtual address word said signal being capable of assuming a first or a second binary state, the first binary state being such as to invalidate the transmission of said virtual address word.

6. A method according to claim 3, wherein the steps of addressing and transmitting can be carried out either simultaneously in a first data mode or sequentially in a second data mode wherein data is not transmitted until after an addressed unit responds to its address and wherein the choice of one of the two data modes aforesaid is made by transmission of a binary-type control signal via the master-type unit which has acquired instantaneous control of the transmission channel to the interface circuits associated therewith, said control signal being capable of assuming either a first or a second binary state, each of said states being associated with one of said two modes.

7. A method according to claim 6, wherein the master-type unit which has initiated the data transfer over the transmission channels emits in conjunction with the address word a first supplementary control signal of binary type which is capable of assuming either a first or a second binary state associated respectively with a command for reception and with a command for transmission of data by the unit addressed by said master-type unit and transmitted by said transmission channel.

8. A method according to claim 7, wherein said master-type unit transmits a second supplementary control signal of binary type which is capable of assuming either a first or a second binary state, the first binary state indicating that the transmitted data are valid.

9. A method according to claim 8, wherein the data to be transmitted by the transmission channel are presented in the form of successive words, each comprising a plurality of signals of binary type, and wherein data transfer can be performed at will either by single word or by block consisting of a number of words, and wherein the master-type unit which has initiated the transfer of data transmits in conjunction with the transmission of said data a third supplementary control signal of binary type which is capable of assuming either a first or a second binary state, the first logic state indicating a block transmission.

10. A method according to claim 9 wherein, the data transfer being performed by block of data words, the second supplementary control signal is set into the first logic state prior to transmission of each word constituting the block and the address emitted by the master-type unit is stored by the addressed unit at the beginning of the transfer and incremented by one unit at each subsequent setting of said supplementary control signal into the first logic state.

11. A data-processing system comprising:

a transmission channel of the multiple conductor bus type including a first group of conductors for carrying control signals, a second group of conductors for carrying address words, and a third group of conductors for carrying data;

a plurality of units, at least one such unit being a master-type unit which is capable of requesting and acquiring instantaneous control of the transmission channel in order to address at least one other unit of said system and to initiate exchanges of data via said channel, and at least one such unit being a slave-type unit which can be addressed by said master-type unit;

a plurality of interfaces, each associated with a corresponding unit and each interface having a first port for connection to its associated unit and a second port for connection to said transmission channel;

means for requesting, by said master unit, control of said transmission channel;

means, responsive to said requesting means, for granting control of said channel to the master unit requesting such control;

said master unit including means for providing control information in the form of control signals on said channel by causing three control signal lines to assume desired states defining one of three possible different addressing modes, the addressing modes being mutually exclusive and being initiated by the master unit which has acquired control of the channel, each said control signal line being capable of assuming either a first or a second binary state, the status of the three control signal lines defining the addressing modes as follows:

the first control signal line being set to said first binary state defining an addressing mode permitting a point-to-point data transfer between the master-type unit which has acquired instantaneous control of the transmission channel and a slave-type unit addressed by said master-type unit;

the second control signal line being set to said first binary state defining an addressing mode Permitting a point-to-point data transfer between the master-type unit which has acquired instantaneous control of the transmission channel and a second master-type unit addressed by the first master-type unit; and the third control signal line being set to said second binary state simultaneously with the setting of the first or second control signal line to said second binary state defining an addressing mode permitting a general broadcast data transfer from the master-type unit which has acquired instantaneous control of the transmission channel to at least all the other master-type units of said system, all of said units being addressed simultaneously;

each master unit including means for addressing one or more units in accordance with an addressing mode previously defined by said control signal lines and means for transmitting digital data from the master unit having acquired control of the channel on said channel in accordance with the addressing mode defined.

12. A device according to claim 11, wherein the number of conductors of the third group which carries data words to be transmitted is a number which can be divided by eight in order to carry data words composed of eight-bit bytes.

13. A device according to claim 11, wherein the interfaces are coupled to the conductors of the groups constituting the transmission channel by means of semiconductor-junction logic-element emitters of the open-collector type in order to make the first binary state preponderant over the second binary state.

14. A device according to claim 11, wherein each of the interfaces and their respective corresponding units are associated with one address and comprise means for performing a continuous comparison between the address words carried by the second group of conductors and said unit associated address in order to identify a particular address and to activate the unit when said unit is addressed.

15. A device according to claim 14, wherein the unit address is gendrated by wired-logic elements.

16. A device according to claim 14, wherein the interfaces associated with said master-type unit comprise at least a first module including controllable amplifying means coupled on a first face thereof to said third group of conductors and on a second face thereof to the associated unit by means of a first internal group of conductors, a second controllable module coupled on a first face thereof to said second group of conductors and on a second face thereof to the associated unit by means of a second internal group of conductors and a third module comprising said address comparison means connected to at least one predetermined portion of the conductors of said second group and combinational-logic and storage means for receiving and emitting on one face thereof said control and invalidation signals carried by the first group of conductors and coupled on the other face thereof by means of a group of conductors for carrying interface-circuit control signals generated by the associated unit.

17. A device according to claim 16, wherein the third module emits two internal-control signals for selective validation control respectively of the amplifying means of the second and first modules.

18. A device according to claim 16, wherein the third module is also coupled to the control granting means which permits operation of the interfaces when control of said channel has been assigned to the associated unit.

19. A device according to claim 14, wherein an interface unit associated with said slave-type unit comprises at least a first module including amplifying and storage means coupled at a first port thereof to said third group of conductors and at a second port thereof to a first internal group of conductors, and a second module comprising said address comparison means and combinational-logic and storage means, said means being connected to said second group of conductors and at least to a predetermined portion of the conductors of said first group of conductors, said portion of conductors being intended to include the connection for carrying a supplementary control signal, and wherein the storage means of the second module records the address word carried by the second group of conductors at the time of setting said supplementary control signal into a first binary state, the storage means being further provided with a counter for incrementing by one unit said address word which is recorded at each subsequent setting of the control signal at the time of a data-word block transfer.

20. A device according to claim 14, wherein at least one interface circuit connected to the transmission channel is associated with a unit comprising means for storing a list of virtual addresses in memory and computing means for forming from one of said virtual addresses a real address representing the address of one unit connected to the transmission channel through interface circuits, and wherein said interface circuits comprise at least means for continuous comparison of the address words carried by the second group of conductors with said list of virtual addresses, means for emitting at the time of a positive comparison a signal for invalidating the address word previously carried and transmitting said signal to the emitting unit and means whereby the real address computed by said computing means is substituted for the address aforesaid.

* * * * *